United States Patent [19]
Hunter

[11] Patent Number: 6,003,783
[45] Date of Patent: Dec. 21, 1999

[54] IRRIGATION SYSTEM, APPARATUS, AND METHOD

[75] Inventor: Paul M. Hunter, Carlsbad, Calif.

[73] Assignee: Installation Systems, L.L.C., Carlsbad, Calif.

[21] Appl. No.: 09/133,930

[22] Filed: Aug. 12, 1998

[51] Int. Cl.$^6$ .................................................. A01G 25/06
[52] U.S. Cl. .......................... 239/200; 239/271; 239/547
[58] Field of Search ..................................... 239/200, 450, 239/556, 565, 536, 271, 272, 547; 30/358, 366, 103

[56] References Cited

U.S. PATENT DOCUMENTS

| | | | |
|---|---|---|---|
| 444,564 | 1/1891 | Copeland | ................................. 239/565 |
| 3,957,292 | 5/1976 | Diggs . | |
| 3,973,732 | 8/1976 | Diggs . | |
| 4,045,060 | 8/1977 | Daigle . | |
| 4,054,984 | 10/1977 | Ball et al. . | |
| 4,712,811 | 12/1987 | Wier . | |
| 4,971,366 | 11/1990 | Towsley . | |
| 5,039,011 | 8/1991 | Parker . | |
| 5,226,231 | 7/1993 | Leebeeck . | |
| 5,242,112 | 9/1993 | Dunn et al. . | |
| 5,251,938 | 10/1993 | Ericksen . | |
| 5,395,139 | 3/1995 | Morrisson . | |
| 5,484,174 | 1/1996 | Gotoh et al. . | |

*Primary Examiner*—Henry J. Recla
*Assistant Examiner*—Huyen Le
*Attorney, Agent, or Firm*—Rader D. Baker; Paul Adams

[57] ABSTRACT

An irrigation system is disclosed. The system features a pair of lines placed generally parallel and proximate to each other in the subsurface. Only one of the lines is directly connected to the water source. The other line serves as an auxiliary to permit the system to be flexibly adapted or expanded to meet changing irrigation demands or landscape conditions. The auxiliary line is separated into discrete segments, each segment pertaining to a selected zone or area to be separately irrigated. Feeder lines run from each discrete segment to sprinklers. Water is provided to the segments via valved bridges extending from the main line to the segment, so that water flows to the segments only by way of the bridges, the bridges permitting separate segments to be activated in a planned manner. The system using dual lines selectively connected by valved bridges at selected points permits the system to be expanded or adapted by the provision of additional separate segments in the auxiliary line connected to the main line by a bridge. The two lines ideally are made from polyethylene, permitting rapid and inexpensive installation of the system. Various tools customized for easy installation of the system are disclosed.

36 Claims, 9 Drawing Sheets

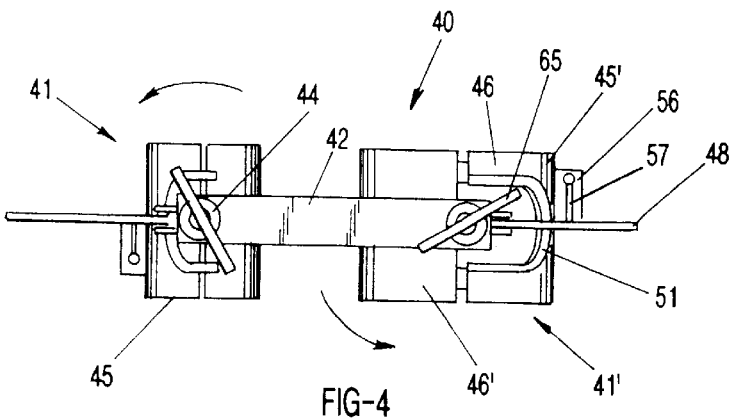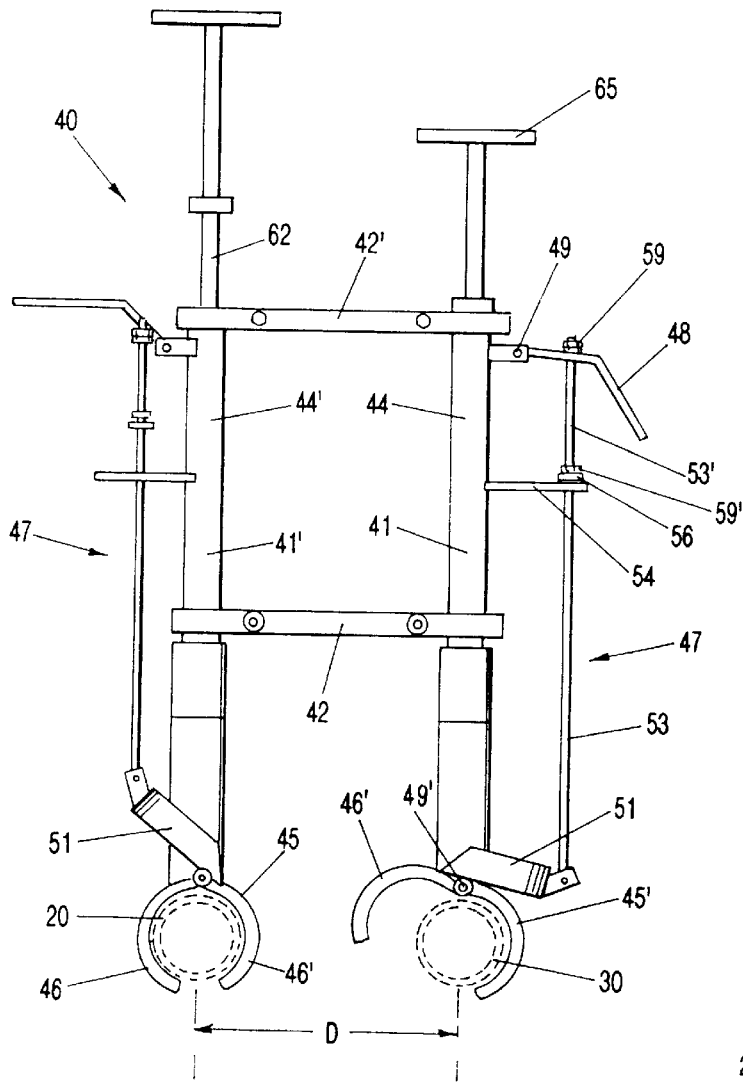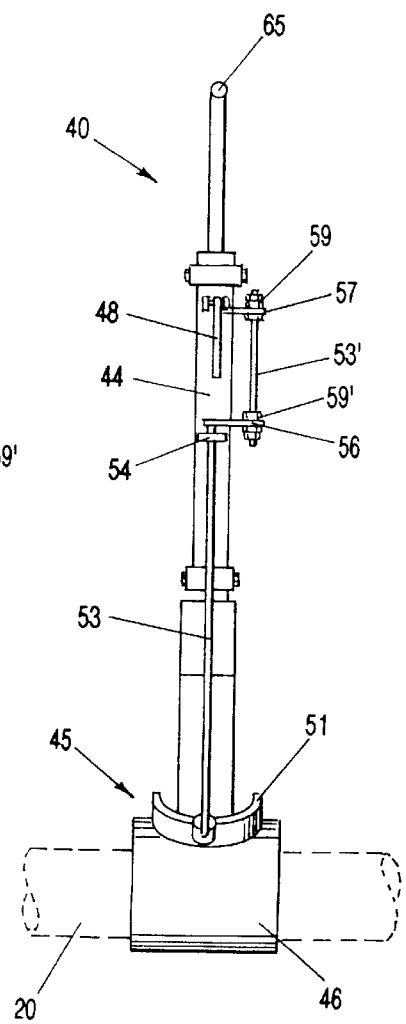

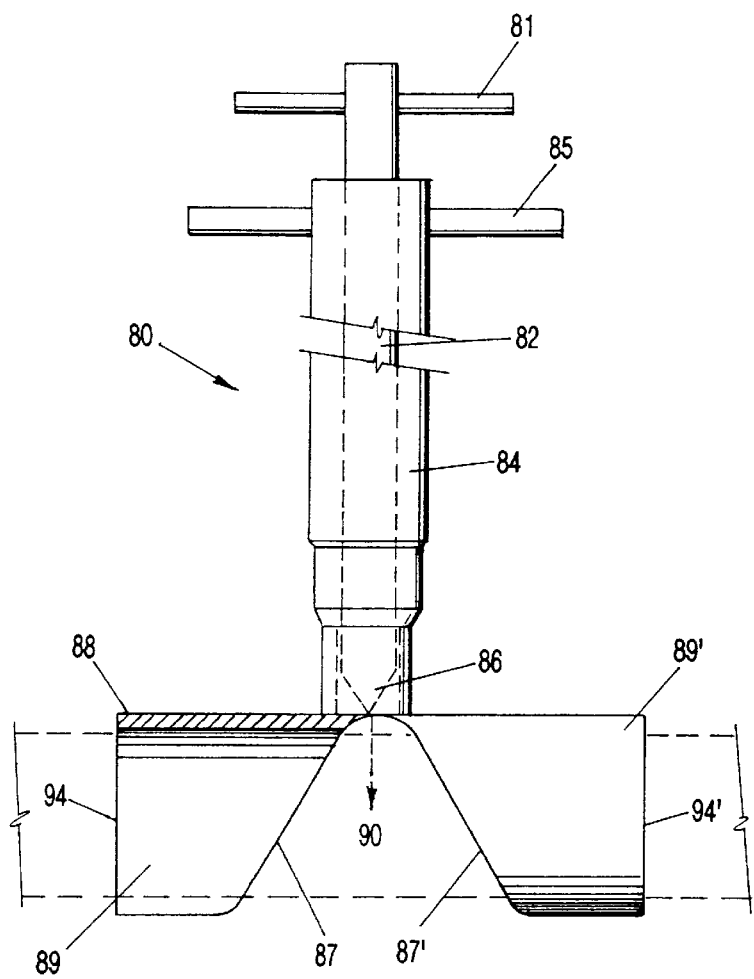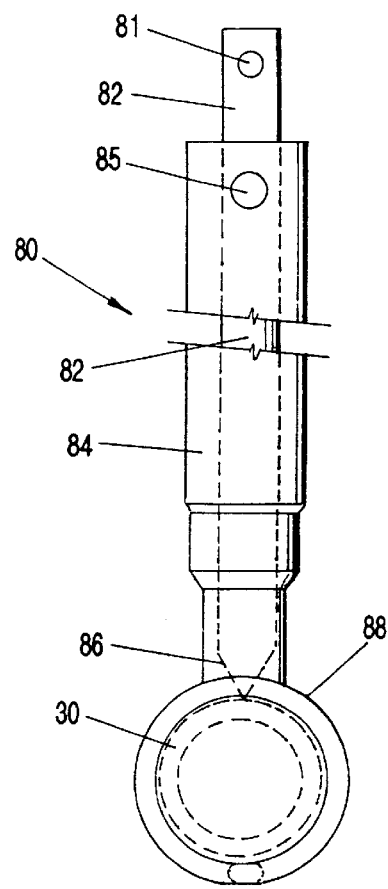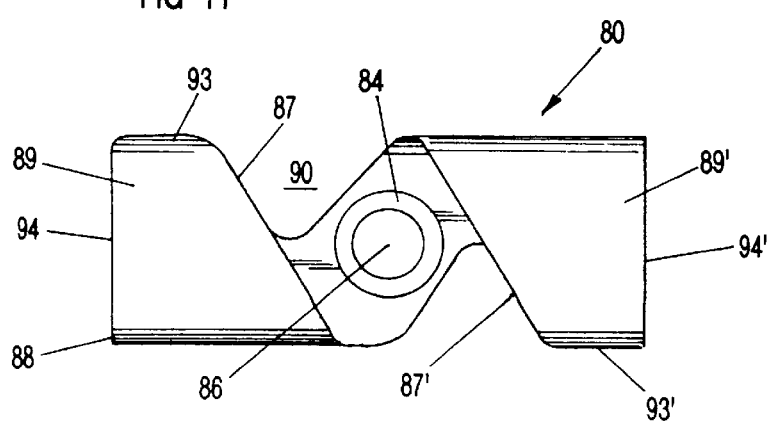
FIG-11
FIG-12
FIG-13

IRRIGATION SYSTEM, APPARATUS, AND METHOD

BACKGROUND OF THE INVENTION

1. Field of the Invention (Technical Field)

The present invention relates to apparatus and methods for irrigation, particularly residential and commercial landscape irrigation, and specifically to an irrigation system and apparatus which is readily adaptable to varying circumstances and which promotes uniform and manageable irrigation water pressure.

2. Background Art

The inconvenience of moving and situating traditional lawn and garden watering hoses, coupled with their unsightliness and inefficiency, has increased the popularity of permanently installed sub-surface residential and commercial landscape irrigation systems. In the typical installation, the overall system is connected to a single source of water, commonly a public water line at or near the residential or commercial structure. The system normally features some type of back-flow preventer at the interface between the irrigation system and the source, to prevent the backflow of irrigation water into the potable public supply. A master valve preferably, but not always, is installed near the back-flow preventer to provide a means for shutting off the water supply to the entire irrigation system. Downstream from the master valve a manifold system is usually provided, consisting of two or more control valves. The manifold divides the main delivery line into two or more zone lines, so that the control valves and zone lines may be used to selectively deliver water to defined "zones" of the landscape. Accordingly, the typical irrigation system currently consists of a number of "forks" or branch lines depending from a single manifold at or near the master source. In some sophisticated systems zone lines may form a circuitous loop. Much more frequently, each zone line is a non-circuitous "dead end" wherein all the water entering the line must be expelled through the dischargers (e.g. sprinklers, bubble irrigators, and the like) on the line; no water returns to the manifold from the zone line.

In this specification and in the claims, "line" shall generally mean a tubular means for conveying a liquid, including pipelines for carrying irrigation water, regardless of material composition or pipeline diameter, unless otherwise specified. In the preferred embodiment of the invention, a line is a flexible tubular pipeline for conveying water beneath the surface of the ground.

The conventional system is problematic in at least two regards. First, the standard system suffers from reduced hydraulic efficiency due to the multi-branched system layout. In the standard ramified layout, each and every branch or "zone" line originates at the manifold (near the master source) and extends—often a considerable distance—to the sometimes remote area of discharge. The extended length of each zone line impairs the delivery of water therethrough. The numerous dead-end branch lines commonly have seriously non-uniform pressure along their respective lengths. Pressure in a given branch line commonly is comparatively high near the manifold (where pressure is nearly equal to the pressure in the main), but falls off considerably as a function of the distance away from the source and toward the distal end of the line. The cause of such a drop-off in pressure is known in the art of fluid mechanics, and is a function of, among other things, the line material and line inside diameter, as well as the length of the line. Nevertheless, the largely intuitive appeal of ramified, "zone" layouts continues to induce their adoption by landscape and irrigation system designers. This popularity continues despite the fact that overall system function is impaired by the reduced water pressure at remote and distally located points of discharge along a branch line. Because pressure varies along the line, identical sprinkler heads manifest inconsistent performance at different points along the line, making deliberate design for uniform and adequate irrigation difficult, particularly for large or irregularly-shaped lawns.

A related drawback of conventional systems is that they are difficult or impossible to expand or customize to meet changing landscaping designs or irrigation needs. For example, to modify an extant system to irrigate a later-added flower garden, an entirely new zone line must be installed, running from the manifold to the zone of the new flower garden. Such an installation requires that the existing landscape be disturbed along a line from the manifold to the flower garden, at significant cost and disruption. The additional line may be especially difficult or disruptive if the new flower garden is distantly located, or if imposing or valuable landscape features (concrete driveways, established flower beds, or the like) have been placed in intervening locations. Moreover, existing branch lines normally may not be tapped into or extended to meet the new demand of the added flower garden. Existing lines usually will be "fine-tuned," for example using particular sprinkler heads at particular locations, to meet only the needs of their respective existing zone. Tapping into or extending extant lines upsets the previous engineering design for that zone, usually resulting in the under-irrigation of the zone during operation of the system.

The adaptability and installation of many known types of irrigation systems also often is complicated by the complex pipe-and-joint mode of construction. Many subsurface systems are constructed of polyvinyl chloride (PVC) pipe, which is comparatively rigid. PVC systems thus must be assembled using a wide assortment of fittings to provide for elbows, tees, forks, bends, and the like. The fitted connections are performed using chemical primers and solvents to bond the fittings together, a labor-intensive process that can be slow and fraught with a number of complications, particularly with inexperienced labor.

Some efforts have been made to avoid the difficulties associated with PVC pipe systems by constructing systems of flexible plastic lines. Such systems have not enjoyed as widespread a popularity as might be expected due, among other reasons, to the perceived need usually to provide a clamped compression at joints and fittings to avoid unacceptable leakage.

Patents representing previous efforts to provide improved tools for irrigation system installation include, for example, U.S. Pat. No. 5,226,231 to De Leebeeck, and U.S. Pat. No. 4,054,984 to Ball et al. Also, a number of disclosures are directed to fittings, couplers, and methods of joining pipe lines, including U.S. Pat. No. 5,484,174 to Gotoh, et al., U.S. Pat. No. 5,395,139 to Morrisson, U.S. Pat. No. 5,251,938 to Ericksen, U.S. Pat. No. 5,242,112 to Dunn et al, U.S. Pat. No. 5,039,011 to Parker, U.S. Pat. No. 4,971,366 to Towsley, U.S. Pat. No. 4,712,811 to Wier, U.S. Pat. No. 4,045,060 to Daigle, U.S. Pat. No. 3,973,732 to Diggs, and U.S. Pat. No. 3,957,292 to Diggs.

A need remains, nevertheless, for an irrigation system and apparatus which promotes uniform water pressure at all points in the system, and which is readily customized and adapted to meet altered landscape designs or modified irrigation needs without upsetting preexisting installation and performance design. A desirable such system also should be easy to install without labor-intensive or time-consuming fittings. From this background, the present invention was developed.

SUMMARY OF THE INVENTION (DISCLOSURE OF THE INVENTION)

The invention relates to an irrigation system and method, and tools for expeditiously installing the system. Broadly described, the system features a pair of lines placed generally proximate to one another in the landscape subsurface. Only one of the lines is connected to the water source. The other line serves as an auxiliary line to permit the system to be flexibly adapted or expanded to meet changing irrigation demands or landscape conditions. The auxiliary line is separated into discrete segments, each segment pertaining to a selected zone or area to be separately irrigated. Lateral feeder lines run from each discrete segment to sprinklers. Water is provided to the segments via valved bridges extending from the main line to each segment, so that water flows to the segments only by way of the bridges, the bridges permitting separate segments to be activated in a planned manner. The system using dual lines selectively connected by valved bridges at selected points permits the system to be expanded or adapted by the provision of additional separate segments in the auxiliary line connected to the main line by a bridge. The two lines ideally are made from polyethylene, permitting rapid and inexpensive installation of the system.

Various tools customized for easy installation of the system are disclosed. Because the main and auxiliary lines preferably are fashioned from polyethylene, the inventive customized tools are used to puncture the main and auxiliary lines and insert couplers into the lines. Inserted couplers are held in place by the reflexive rebound of the walls of the lines against barbed portions of the couplers to permit the interconnection of the valve bridges between the main and auxiliary lines, and to permit the lateral feeder lines to be connected to the auxiliary line.

Accordingly, there is provided according to the invention a system for delivering water from a source to a selected area within landscape, the system comprising a main line disposed beneath the landscape and having two ends, at least one of the ends connected to the source, an auxiliary line parallel proximate to the main line, means for defining at least one close-ended segment in the auxiliary line, at least one discharger in the selected area in fluid communication with the segment, means for fluidly connecting the segment to the main line. Preferably, but not necessarily, both ends of the main line are connected to the source. The segment typically comprises a segment severed from the auxiliary line and the means for defining comprises caps fixed to ends of the segment. The means for connecting the segment to the main line comprises a tubular bridge disposed between the main line and the segment. Preferably, the bridge includes a valve. Also, the main line and the auxiliary lines each preferably comprises a resiliently elastic wall, and the means for connecting further comprises: means for puncturing a hole in the wall of the auxiliary line at a point on the segment and inserting a first coupler into the hole; and means for puncturing a hole in the wall of the main line at a point on the main line and inserting a second coupler into the hole, wherein the bridge is connectable to the couplers, and the walls of the segment and of the main line reflexively rebound against respective the couplers substantially to seal the holes against leakage. Preferably, the means for puncturing comprises: a rigid tubular housing having an upper end and a lower end, clamp means on the lower end for circumferentially supporting a respective one of the lines at one of the points, a punch controllably movable axially within the housing and extendable at least partially from the lower end, and means in the housing for controlling movement of the punch, wherein the coupler is removably disposable around the punch. The means for controlling the movement of the punch may include a threaded block in the housing, a threaded rod connected to the punch and engaged with the threaded block, and a rotatable handle emergent from the upper end and connected to the rod, wherein rotation of the handle rotates the rod thereby to cause the punch to move axially within the housing. The clamp means may comprise a fixed jaw and a pivotal jaw. A means is disclosed for connecting the at least one discharger to the segment, the means comprises a lateral feeder line in fluid communication with the discharger and with the segment. The segment preferably comprises a resiliently elastic wall, and the means for connecting further comprises: means for puncturing a hole in the wall at a point on the segment, and means for releasably gripping a coupler to insert the coupler into the hole, wherein the lateral feeder line is connected to the coupler and the wall reflexively rebounds against the coupler substantially to seal the hole against leakage. The tool means for puncturing comprises a rigid tubular housing having an upper end and a lower end, grip means on the lower end for circumferentially supporting the segment at the point, a punch movable axially within the housing and extendable at least partially from the lower end, and means in the housing for controlling movement of the punch. The means for controlling movement of the punch comprises a threaded block in the housing, a threaded rod mounting the punch and engaged with the threaded block, and a rotatable handle emergent from the upper end and connected to the rod, wherein rotation of the handle rotates the rod thereby to cause the punch to move axially within the housing. The grip means preferably comprises a pair of fixed, longitudinally offset arcuate flanges defining there between a space for receiving the segment. The preferred means for releasably gripping a coupler comprises an elongated handle and a slotted cylindrical body, defining a central hollow therein, secured to an end of the elongated handle; so that the coupler is slidably disposable into the central hollow.

An analogous method, including the use of the customized installation tools and the tools themselves, are also within the purview of the invention.

A primary object of the present invention is to provide an irrigation system that is rapidly and inexpensively installed.

Another object of the invention is to provide innovative customized tools for installing the irrigation system according to the invention.

A primary advantage of the present invention is that there is provided an irrigation system that is readily adaptable and expandable to meet changing irrigation needs.

Another advantage of the invention is that generally uniform fluid pressure is provided throughout the inventive system, making it easier to plan and design the system layout and the location of sprinklers.

Another advantage of the present invention is that the uniform fluid pressure in the inventive system is relatively unaffected by subsequent system adaptations, modifications, and expansions.

Still another advantage of the invention is that there is provided an irrigation method that accommodates changes in landscape designs.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 4 is a top view of a preferred embodiment of a bridge installation tool according to the present invention;

FIG. 5 is a front view of the bridge installation tool shown in FIG. 4;

FIG. 6 is a side view of the bridge installation tool shown in FIG. 5;

FIG. 11 is a side view of a lateral coupler punch tool according to the present invention;

FIG. 12 is a front view of the lateral coupler punch tool shown in FIG. 11;

FIG. 13 is a bottom view of the lateral coupler punch tool shown in FIG. 11;

DESCRIPTION OF THE PREFERRED EMBODIMENTS (BEST MODES FOR CARRYING OUT THE INVENTION)

The invention relates to irrigation systems and apparatus. There is provided by the invention a system for irrigating a commercial or residential landscape which provides flexibility and efficiency not previously achieved in the art. Apparatus are disclosed for quickly and effectively installing the inventive system.

Figure 1:
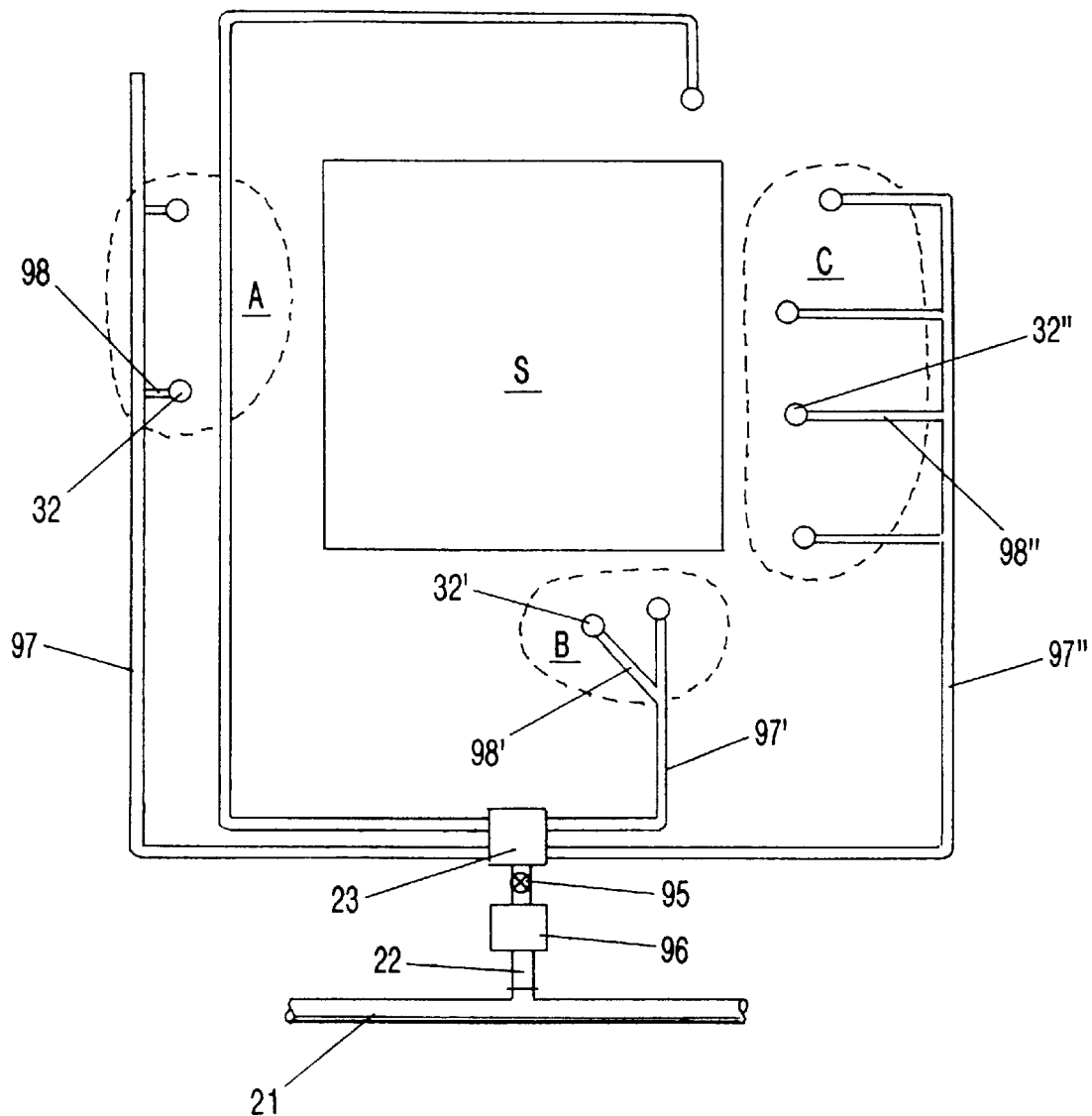
FIG. 1 is a plan diagram of the general configuration of a typical irrigation system known in the art.

FIG. 1 is a plan diagram of the typical irrigation system installation known in the art. In most current systems, the system is supplied from a single source 21 of irrigation water, such as a junction with a municipal potable water distribution network, or a well, or the like. A trunk line 22 moves water from the source 21 to a manifold 23. Conventionally, a backflow check valve 96 and main shut-off valve 95 are provided in the trunk line 22 to prevent contamination of the municipal supply and provide a means to shut off flow to the entire system, respectively.

In most known systems, the manifold 23 is located near the source and directs the flow of water from the source 21 into a plurality of main lines 97, 97', 97". Each one of the main lines 97, 97', 97" extends an often considerable distance from the manifold 23 to respective areas A, B, and C to be irrigated, typically surrounding a structure S. At the respective areas A, B, C, any number of lateral feeder lines 98, 98', 98" branch off from each main line 97, 97', or 97" to deliver water from the main lines 97, 97', 97" to corresponding dischargers 32, 32', 32. Dischargers 32, 32', 32 may be any known means for disbursing irrigation water, and come in many types of pop-up sprinklers, oscillating sprinkler heads, bubbling heads, and the like. Ordinarily, a valve for each respective main 97, 97', 97" is provided at or near the manifold, with which the flow of water may be selectively directed to individual mains, e.g. one at a time for a fixed period of time, in timed rotation.

Conventional systems suffer from at least two principal shortcomings, both of which are symptomatic of a system layout that demands that each separate main 97, 97', 97" originate at the common manifold 23 near the source 21. First, the water pressure at a discharger 32 nearer the manifold 23 nearly always is considerably higher than the pressure at some other discharger 32" located more remotely from the manifold 23 (and therefore the source 21). This results in difficult system planning and design because, depending upon the length of the runs and the amount of friction in the mains 97, 97', 97" and the laterals 98, 98', and 98", the design must anticipate how far one discharger should be from the next adjacent in order to provide proper coverage—while still taking into account the pressure differential, which differential in turn affects the area that a particular discharger will cover.

A second problem arises when an existing system is to be expanded. An expansion to a conventional system commonly requires going all the way back to the manifold 23 and laying an entirely new main line, because none of the existing mains 97, 97', 97" may be modified without upsetting the delicate balancing of the different discharger coverage areas established in view of the observed pressure differentials. Tapping into an existing main causes an unacceptable pressure drop to pre-existing dischargers, and coverage after the modification is nearly certain to be inadequate. Moreover, pressure to a remote extension often will be insufficient to service the new area.

Finally, the material of choice for most existing systems is PVC pipe, which is relatively rigid and the various PVC pipe junctions are interconnected with elbows, tees, or similar plumbing-type fittings. This limits the planning of the system which is constrained by the various pipes and fittings available. PVC pipeline installation also is labor-intensive, requiring the "gluing" of joints and fittings, sawing of pipe, etc.

Figure 2:
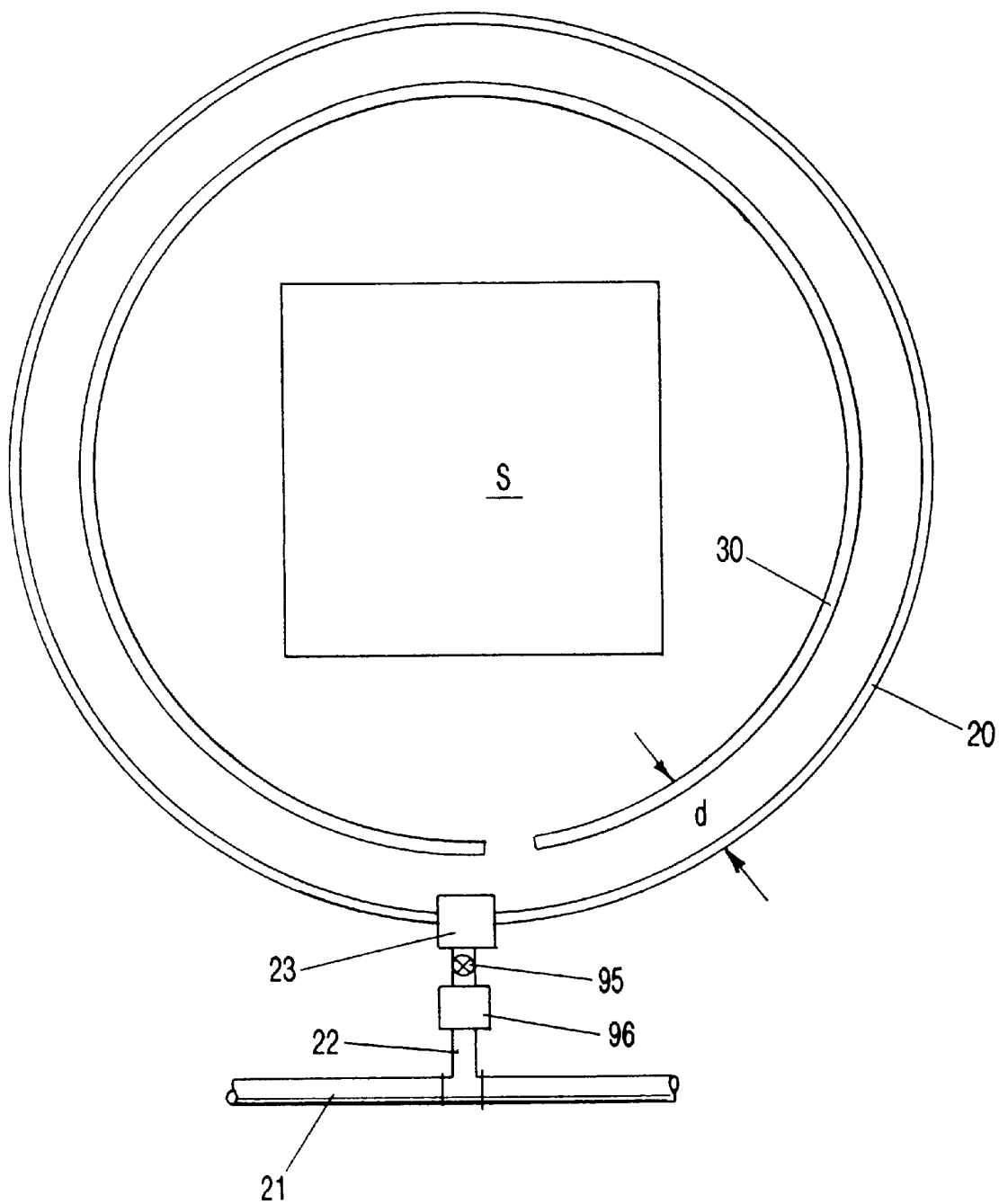
FIG. 2 is a plan diagram of the basic configuration of one preferred embodiment of the irrigation system according to the present invention.

Reference is made to FIG. 2 which is not necessarily to scale but provides a diagrammatic representation of the basic layout of the inventive system. The irrigation system of the present invention employs an entirely different concept insofar as the distribution of the water throughout the areas to be covered. In the system of the invention, two subsurface lines, a single main line 20 and an auxiliary line 30, are laid along substantially the same route, but parallel and spaced apart from one another by a uniform short distance d, e.g., six inches. While the system may be installed using conventional trench-and fill techniques, an advantage of the invention is its amenability to newer "pull-through" methodologies, such as that discussed in my co-pending application Ser. No. 08/706,785, entitled "Vibratory Pipe and Cable Laying Plow" filed Sep. 3, 1996, which is hereby incorporated by reference. In pull-through techniques, the leading end of a line or cable is introduced to the proper subsurface depth, typically but not necessarily by way of an excavated open hole. The line is then pulled through the subsurface at that depth by means of surface equipment incorporating specialized tools which break the surface but displace little or no soil while moving through the subsurface. The tool is dragged through the subsurface, as by a small tractor, while pulling the line behind. The line thereby is placed with minimal surface disturbance or excavation. Preferably but not necessarily therefore, the main 20 and auxiliary 30 lines of the present invention are pulled through the subsurface simultaneously (or separately). In the preferred embodiment, the lines 20, 30 are composed of flexible pipe such as polyethylene, permitting them to be installed in curved configurations or even in circles, as suggested by FIG. 2, in marked contrast to the generally rectilinear installations typified by PVC lines and as indicated in FIG. 1. The lines 20, 30 typically have a diameter of about 1.25 inches (by way of example, not limitation) in the usual commercial or residential application.

The basic layout thus has the main line 20, at least one but possibly both ends of which are connected to the source 21 either directly, or more preferably, via a trunk line 22 having, for example, a main valve 95, a pressure-reducer, or other known fittings. For at least a portion of there respective lengths, the main line 20 is substantially parallel to the auxiliary line 30, and separated therefrom by distance d. The auxiliary line 30 preferably has its ends proximate to the respective ends of the main line 20, but the auxiliary line is not connected to the water source. The ends of the auxiliary line 30 instead are simply closed with caps or the like. It is seen, therefore, that initially only the main line 20 receives and transports water; the auxiliary line contains no fluid until connected to the main line 20.

Figure 3:
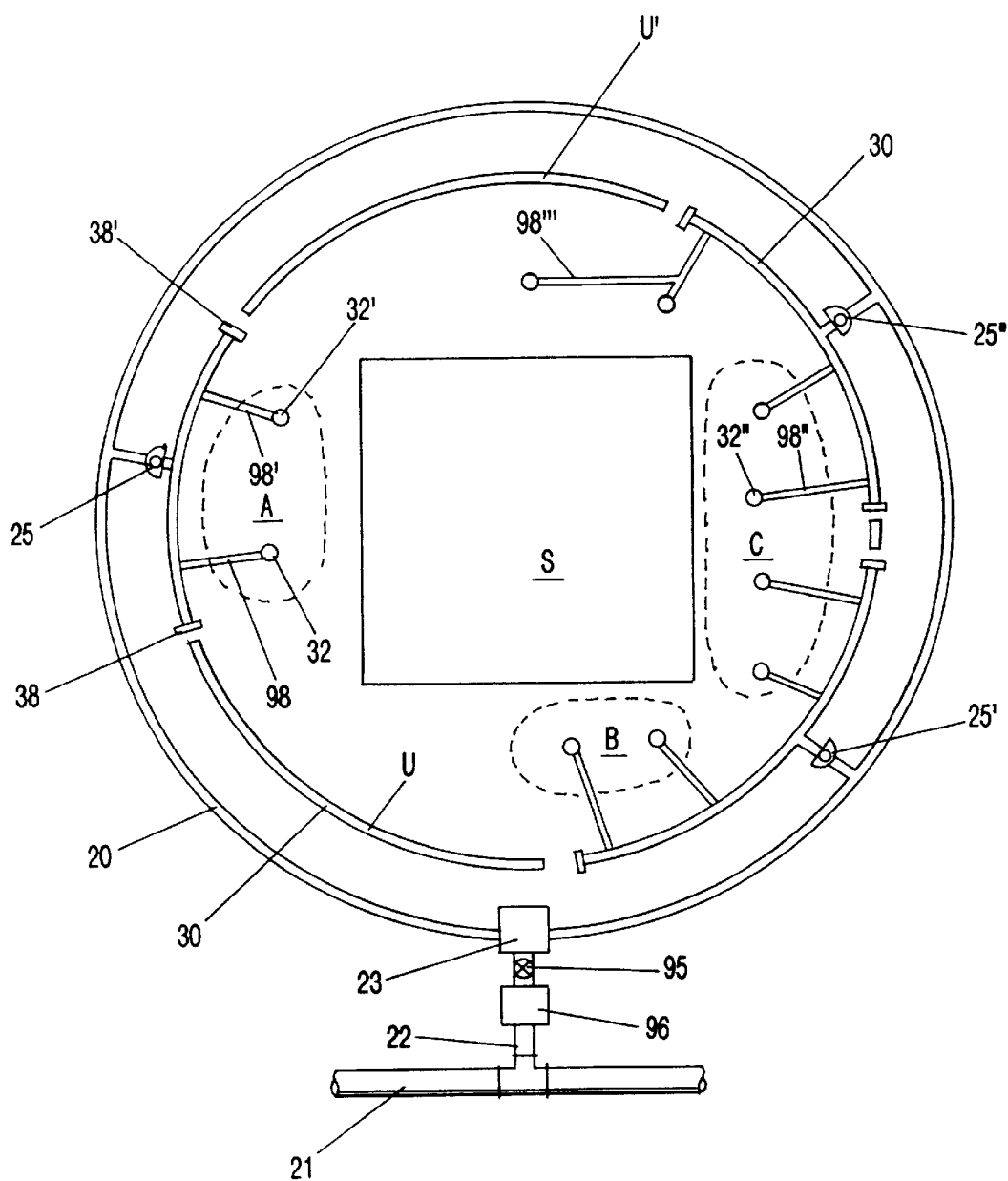
FIG. 3 is a plan diagram of the system shown in FIG. 2, after modification.

FIG. 3 shows that the auxiliary line 30 allows the system to be completed to deliver water to areas A, B, C without having to account for wide variations in water pressure along the system. To deliver water to area A, for example, a valve bridge 25 is installed to fluidly connect the main line 20 to the auxiliary line 30. The auxiliary line 30 is severed and the severed ends capped to define a segment of auxiliary line that will service area A, as shown by FIG. 3. The desired number of dischargers 32, 32' are disposed within area A where indicated by landscape design and engineering, and laterals feeder lines 98, 98' are then installed to provide fluid communication from the segment of the auxiliary line 30 to the dischargers 32, 32'. Water then may flow from the main line 20, through the valve bridge 25 into the segment of the auxiliary line defined by the caps 38, 38'. Water flows from the auxiliary line segment and through the lateral feeders 98, 98' for dispersal to the landscape by the dischargers 32, 32'. Of course, laterals may be lengthy, and themselves support sub-laterals 98'" as suggested by FIG. 3.

This installation process may be repeated various times along the route of the lines 20 and 30, as seen in FIG. 3. Two or more segments (three shown in FIG. 3) similarly are defined in the auxiliary line 20 and valve bridges 25', 25" installed to provide fluid communication from the main line 20 to the segments in order to deliver water to the respective landscape areas B and C. Notably, some uncapped severed portions U, U' repose unused in the subsurface, but are available for later use, if desired, to expand or adapt the system. Practically any portion of the auxiliary line 30, including previously untapped portions such as U, U', remains available for use at any time by the expedient of defining a segment therein by exposing, severing, and capping ends of the segment and installing a valve bridge between the segment and the main line 20. A distinct advantage of the invention is the ease with which a valve bridge 25 may be removed and replaced; current valves are difficult to pull and replace when damaged, etc.

As described, the preferred embodiment includes the definition of segments in the auxiliary line 30 by severing and capping the auxiliary line. The scope of the invention is not so limited, however, and segments may be defined in the auxiliary line 30 by other means, such as by inserting blocks or plugs into the auxiliary line at selected locations, or by clamping the auxiliary line at selected points to press the walls of the line together substantially to arrest the flow of water, or the like. Segments may be defined by inserting valves in the auxiliary line which, when closed, demark the ends of two adjacent segments. The common characteristic is that all segments, when in use, are close-ended in the sense that water does not flow in or out of either end of a segment. Moreover, adjacent segments are fluidly disconnected; water does not flow from one segment directly into another segment.

Also, for the sake of clarity of illustration, FIG. 3 shows the lateral feeder lines 98, 98' in all instances depending spoke-like from the radially inward side of the auxiliary line segment; it is clear to one of ordinary skill in the art, however, that lateral feeders may depart from the auxiliary line in practically any direction and at any angle. The skilled practitioner in the art may locate the dischargers 32, 32', 32" where needed, and then provide laterals 98, 98', 98" of various lengths and dispositions accordingly.

It is seen therefore, that the practice of the invention involves, for the provision of a system network for delivering water from a source to a plurality of selected areas (for example A, B, C) within a landscape: (1) the disposition beneath the landscape of one main line 20 having two ends (at least one of the ends being connected to the water source); (2) disposing one auxiliary line 30 parallel proximate to the main line; (3) defining (such as by clamps or caps 38, 38') a close-ended segment in the auxiliary line 30 in the vicinity of each selected area; (4) disposing at least one discharger 32 in each selected area and in fluid communication with the auxiliary line segment; and (5) fluidly connecting each auxiliary line segment to the main line 20. One or ordinary skill in the art will immediately appreciate that an effective initial system layout may be designed, and later modified if needed, by the planned provision applying known principles of two or several segments defined in the auxiliary line 30, with dischargers 32 strategically located and supplied by laterals 98. Each segment is connected to the main line 20 by a bridge valve 25 of mostly known construction, but further described herein, the bridge valve 25 allowing controlled and/or timed supply of water from the main line into the auxiliary line segment.

Accordingly, a practically infinite array of system configurations and layouts is possible according to the invention. The main and auxiliary lines 20, 30 do not have to be placed in circular layouts as seen in the Figures, but instead can be laid according to the dictates of the landscape design. If desired, only one end of the main line 20 may be in fluid connection with the source 21. Different auxiliary line segments may have widely disparate lengths, and lateral feeders 98, 98' can be of differing lengths and layout (not necessarily rectilinear). A given auxiliary line segment may support any of lateral feeders, limited by system pressure and flow.

Notably, the use of a single main line 20 and bridge valves 25, 25' to supply water to discrete segments of the auxiliary line 30 significantly ameliorates the problem of widely variable pressures in the system. The pressure along the length of the main line 20 is mostly unaffected by the number of auxiliary line segments or the number of laterals 98, 98' and dischargers 32, 32' connected to each segment. The flexibility of an existing system to permit adaptation to add further segments and laterals at later dates also is apparent.

The invention includes tools specially configured for accomplishing the connection of the lateral feeders to the auxiliary line 30, and for connecting the auxiliary line to the main line 20. The tool apparatus of the invention permits the connections to be made simply, expeditiously, and reliably without the use of time-consuming solvents or adhesives, and with a minimum labor. The tool apparatus of the invention exploit the resilient elasticity of the walls of the main 20 and auxiliary 30 lines. The tools allow the user to nearly concurrently punch a hole into a line and insert a coupling or fitting therein.

FIGS. 4–6 depict a bridge installation tool 40, with which the auxiliary line 30 quickly and easily can be connected to the main line 20. The bridge installation tool 40 presents the advantage, among others, of automatically providing properly spaced insertion holes in the auxiliary line 30 and the main line 20 for the insertion of coupler fittings 27 for receiving the valve bridge 25. The principal elements of the bridge installation tool 40 are fashioned from steel, aluminum, or other suitable metals or alloys, or plastic, providing rigid strength and durability.

The bridge installation tool 40 is generally bilaterally symmetrical, as best seen in FIG. 5, providing dual portions 41, 41' for puncturing the main line 20 and the auxiliary line 30, respectively. The portions 41, 41' are held together, mutually parallel, at a fixed spaced distance D by one, or preferably two, or more horizontal braces 42, 42'. The portions 41, 41' are substantially the same in function and construction, so that description of one portion 41 serves to describe each. Each portion 41, 41' performs two principal functions. First, each serves as a means for circumferentially supporting the main line 20 or auxiliary line 30, respectively, during the practice of the invention. Also, each portion 41, 41' is a means for puncturing a hole in the wall of either the main line 20 at a point on the main line, or the wall of the auxiliary line 30 at a point thereon, and inserting couplers 27 into the respective holes. In use, the bridge installation tool 40 is positioned generally as depicted in FIGS. 5 and 6, with the portions 41, 41' generally vertical with respect to the surface of the landscape, and substantially perpendicular to the main line 20 and the auxiliary line 30.

One portion 41 will be described in detail, but again it is understood that the other portion 41' is substantially the same in description. Generally, each portion 41, 41' of the bridge installation tool 40 includes a rigid tubular housing 44 having an upper end and a lower end. The housing 44 preferably is rotatably mounted through apertures in the braces 42, 42', such that the housing is secured against significant vertical "up and down" translation with respect to the braces 42, 42', but may axially rotate within the braces 42, 42', as indicated by the directional arrows of FIG. 4. Clamps 45, 45' having jaws 46, 46' are disposed at the lower ends of the housings 44, 44'.

The clamps 45, 45' are used to supportively grip the lines 20, 30, as indicated by FIG. 5. The movable jaw 46' is operated by means of a handle 47 having a grip 48. The user's up-and-down pivoting of the grip 48 is transferred via interconnected transfer rods 53, 53' to the movable jaw 46', thereby allowing the user to open and close the jaws 46, 46' remotely from the top of the tool 40. As shall also be described in detail with particular reference to FIG. 8, a turn rod 62 is coaxially disposed within the housing 44. A punch 66 is attached to the lower end of the turn rod 62, which punch removably mounts a barbed fitting or coupler 27. A threaded screw portion 63 of the turn rod 62 has threaded engagement with a threaded block 60 within the lower end of the housing 44, so that manual rotation of a handle 65 at the top of the rod 62 results in the screwed motion of the rod axially within the housing. By turning the rod 62 downward into the block 60, the punch 66 may be forced through the wall of the line 20 or 30, puncturing a hole in the wall and carrying with the punch the coupler 27 for simultaneous insertion into the hole. By regulating the turning of the rod 62 in the block 60, the axial (up-and-down) movement of the punch 66 is controlled.

It is immediately appreciated that alternative modes of controlling the movement of the punch 66 are available and usable within the spirit of the invention. For example, the housing 44 may be modified to mount a pivotal lever to draw a rod and the punch 66 upward and force it downward within the housing. Or, in a simplest equivalent, a rod may be extended from the punch so as to protrude from the top of the housing, whereby the punch may be forced downward by the expedient of hammering on the top end of the rod; the punch, in this equivalent, could then be withdrawn by grasping the protruding end of the rod and pulling it upward.

The clamp or grip 45 is disposed at the lower end of the housing 44 for circumferentially supporting a line 20 or 30 at a point; in the preferred embodiment, the pivotal clamp has a fixed jaw 46 rigidly attached to the lower end of the housing 44 and a movable jaw 46' pivotally connected to the lower end of the housing. Combined reference to FIGS. 4 and 5 illustrates that both jaws 46, 46' radially are generally semicircular and arcuate, and longitudinally may be characterized as segments of a tube or cylinder. As seen in FIG. 6, the jaws 46, 46' preferably have inside radii that approximate the outside radii of the respective lines 20, 30 around which they will be clamped. The jaws 46, 46' may define equal arcs, or may define unequal but generally supplementary arcs; preferably, they define approximately equal arcs of from about 150 degrees to about 180 degrees, such that when the movable jaw 46' is pivoted from an open position (as seen on the right portion 41 of FIG. 5) to a closed position (as seen on the left portion 41 in FIG. 5), the jaws together circumscribe a mostly but incompletely closed circle, as seen in FIG. 5, or alternatively a full circle, about the periphery of the line 20, 30. When closed about the line 20, the jaws 46, 46' of the clamp contact the circumferential surface of the line along a significant segment of its length (e.g. four to eight inches) to provide radial support thereto.

A handle 47 is disposed on the housing 44, for operating the clamp jaws 46, 46', particularly the movable jaw 46'. The handle 47 features a grip 48 pivotally mounted to the upper end of the housing 44, as by a pin 49, so that the grip pivots in a vertical plane. A lever arm 51 wraps partially around the outside of the lower end of the housing 44, and is rigidly connected to the movable jaw 46' on opposite sides of the housing, as best seen in FIGS. 4 and 6. Referring to FIG. 5, it is seen that the integral combination of jaw 46' and lever arm 51 pivot together about a pivot pin 49' or the like disposed upon the lower end of the housing 44.

An interconnected pair of transfer rods 53, 53' are disposed parallel to the housing 44, and function to permit the pivotal movement of the movable jaw 46' by operation of the grip 48. The lower transfer rod 53 is slidably disposed through a slot in a support tab 54 rigidly projecting from the housing 44, with the lower end of the lower rod 53 pivotally connected to the lever arm 51, as by a pin or the like. The upper end of the lower rod 53 just above the support tab 54 is secured to a planar connector 56. The lower end of the upper transfer rod 53' also is connected to the planar connector 56 so that the rods 53, 53' may translate vertically up and down as an integral unit. In the preferred embodiment, the connection of the lower end of the upper transfer rod 53' to the planar connector 56 is by mated threads, whereby the threaded lower end of the upper rod 53' is screwed through a tapped hole in the connector 56. The upper end of the upper transfer rod 53' is attached to a horizontal tab 57 fixedly extending from a medial portion of the grip 48, as seen in FIGS. 4–6. The connection between the grip tab 57 and the upper transfer rod 53' also preferably is by mated threading, as by the rod 53' screwing into a tapped hole through the tab 57. By means of the screwed connection between the upper rod 53' and the connector 56 and the tab 57, the distance between the tab 57 and the connector 56 may be selectively adjusted by turning the upper rod 53' in the respective tapped holes in the connector 56 and horizontal tab 57. By changing the distance between the tab 57 and the connector 56 by screwing the upper transfer rod 53' in and out of the tab and connector, the effective length of the upper rod 53' (and thus the effective length of the combination of rods 53, 53') may be selectively adjusted. Adjusting the effective length of the upper transfer rod 53' allows the degree of pivot, and/or of clamping pressure, of the movable jaw 46' to be selected. Once the effective length of the combination of transfer rods 53, 53' has been adjusted, it may be set and fixed by means of nuts 59, 59' tightened against the tab 57 and/or connector 56.

Each portion 41, 41' of the bridge installation tool 40 also serves as a means for puncturing a hole in the wall of a line 20 or 30 and inserting a coupler 27 into the hole. Attention is invited to FIGS. 7 and 8, enlarged axial cross-sectional views of the lower reaches of a portion 41 of the tool 40. The housing 44 is a hollow tube. Fixed interior to the housing, substantially proximate its lower end, is a tapped and threaded cylindrical block 60 having an outside diameter substantially equal to the inside diameter of the housing 44. A lengthy turn rod 62 is disposed coaxially within the interior of the housing 44, and runs substantially the length of the housing. The turn rod 62 has a threaded screw portion 63 which is screwed through the threaded hole in the block 60. The rotation of the turn rod 62 causes the screw portion 63, whose threads are engaged with those of the block 60, to move up and down with respect to the block and the housing 44. The turn rod 62 has sufficient length that a portion extends from the upper end of the housing 44 to provide a rotatable handle 65 emergent at the top of the housing (FIG. 5). By manually rotating the handle 65, therefore, the user can move the turn rod 62 up and down axially within the housing 44 due to the engagement of the threaded screw portion 63 with the threaded block 60.

Figure 7:
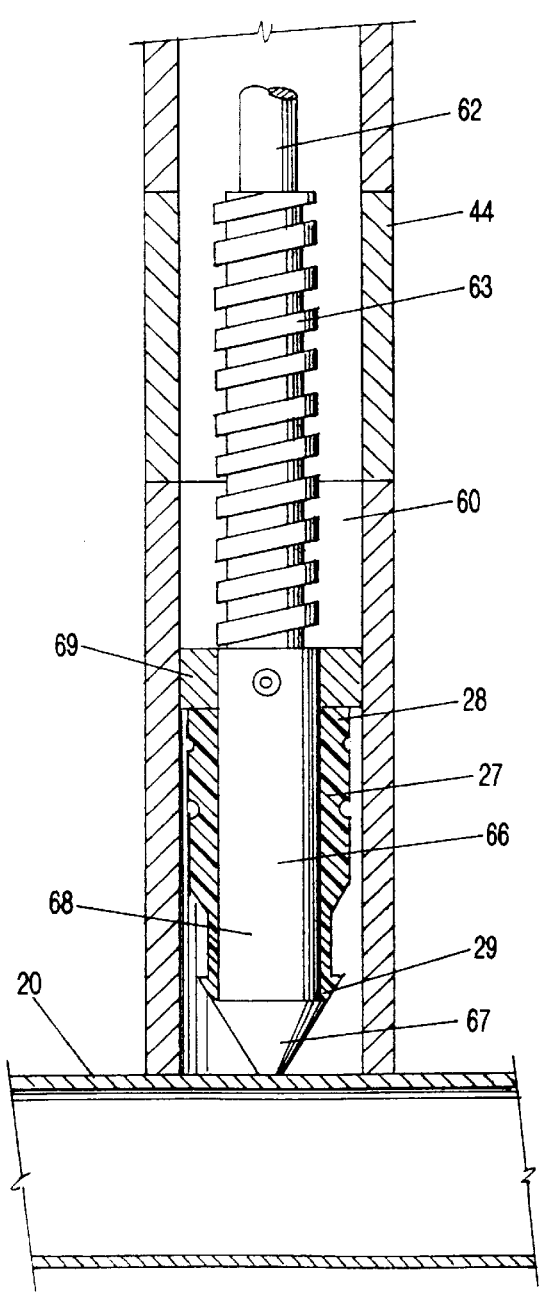
FIG. 7 is an enlarged side sectional view of a portion of the tool depicted in FIG. 4, taken substantially along line 7—7 in FIG. 4, showing the position of the punch portion of the tool immediately before inserting a coupling into a line.
Figure 8:
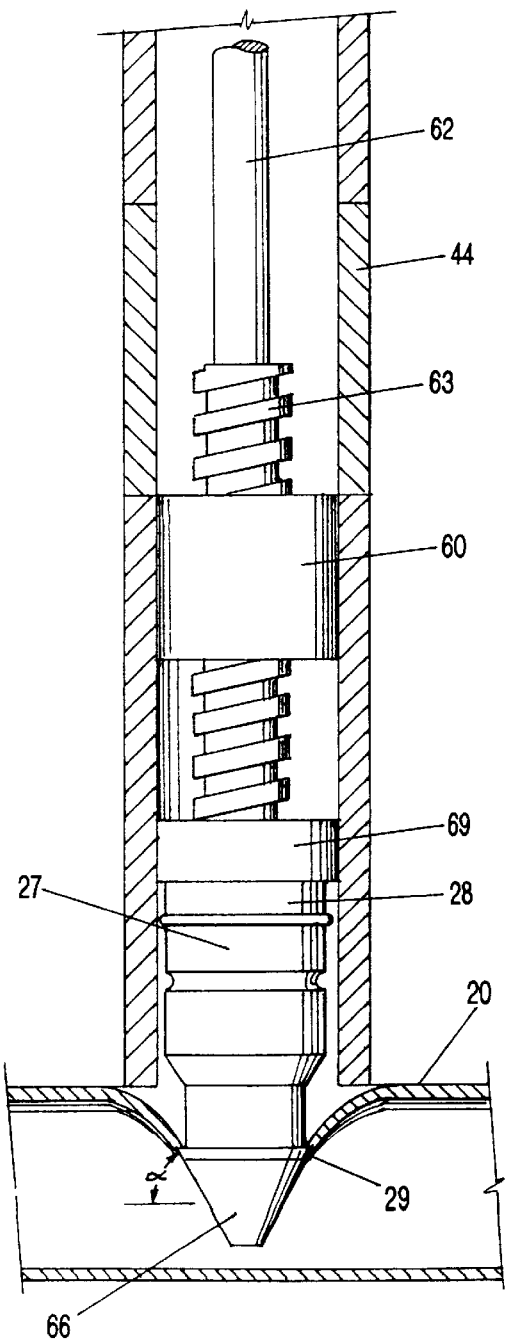
FIG. 8 is side sectional view of the portion of the tool depicted in FIG. 7, showing the coupling in position inserted into the line immediately after insertion, and the punch portion about to be retracted from the coupling.

Continuing reference is made to FIGS. 7 and 8. A punch 66 is controllably movable axially within the housing 44, and is extendable at least partially from the lower end of the housing, due to the attachment of the hard steel punch 66 to the lower end of the turn rod 62. The punch 66 preferably is removably secured to the end of the rod 62, as by set a set screw or the like, so that punch 66 can be removed for repair or replacement. As the turn rod 62 is controllably rotated, it moves axially up and down within the housing 44, moving the punch 66 with it. By turning the rod 62 down through the block 60 the punch 66 is caused to emerge from the lower end of the housing 44. The rod 62 with its threaded screw portion 63, and the threaded block 60 accordingly provide a means for controlling the axial movement of the punch 66.

As best seen in FIG. 7, the punch 66 is configured to mount a coupler 27 specially adapted for insertion into a line 20 or 30. The punch 66 has a sharp point at the end of its generally conical tip 67; the tip 67 preferably is integral with a solid shaft 68. The shaft 68 has an outside diameter substantially smaller than the inside diameter of the housing 44. Fixed to the top of the shaft 68, or integrally formed therewith, is an annular or arcuate stop ring 69 having a diameter about equal to the inside diameter of the housing 44. Stop ring 69 is in slidable contact with the inside of the housing 44 and serves to stabilize the radial position of the punch 66 as well as to provide an abutment which pushes the coupler 27.

As FIGS. 7 and 8 show, the radius of the shaft 68 is slightly less than the inside radius of the coupler 27. Also, the axial or longitudinal length of the shaft 68 below the stop ring 69 is about equal, or only slightly less, than the overall length of the coupler 27. To practice the invention, the coupler 27 is slipped over and around the shaft 68 of the punch 66, and slid into position until the coupler butt 28 is seated against the stop ring 69. With the coupler 27 so positioned upon the punch 66, the tip 67 emerges from the tapered and barbed head 29 of the coupler 27, as seen in the figures. Notably, and as best seen in FIG. 8, the punch 66 is configured such that the angle a defining the cone of the tip 67 is substantially the same as the angle defining the taper of the barbed head 29 of the coupler 27. Accordingly, with the coupler 27 properly positioned upon the punch 66, the surface of the tip 67 is essentially flush with the surface of the coupler head 29, the two surfaces defining a single segmented conical surface described by angle α. This arrangement promotes a smooth concurrent insertion of the punch 66 and the coupler 27 through the wall of the line 20, with minimal effort due to the snagging or catching of the head with the outside of the wall, as suggested by FIG. 8.

Figure 9:
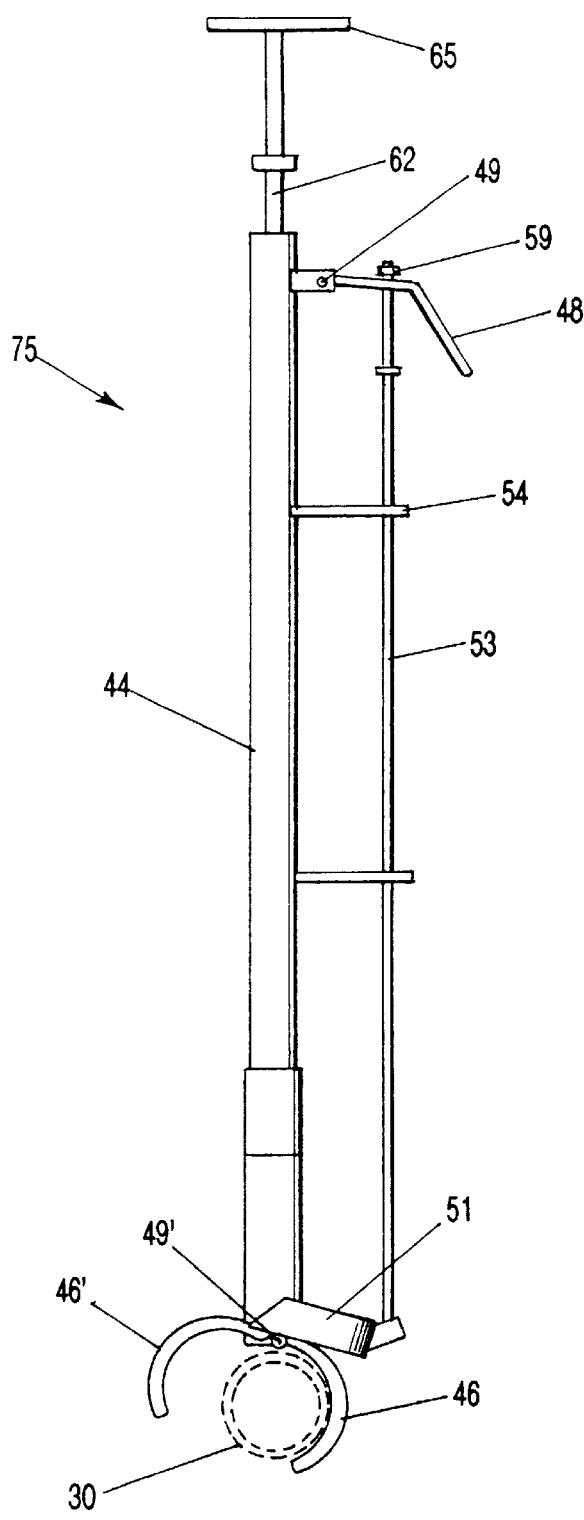
FIG. 9 is a front view of a single coupler installation tool according to the present invention.
Figure 10:
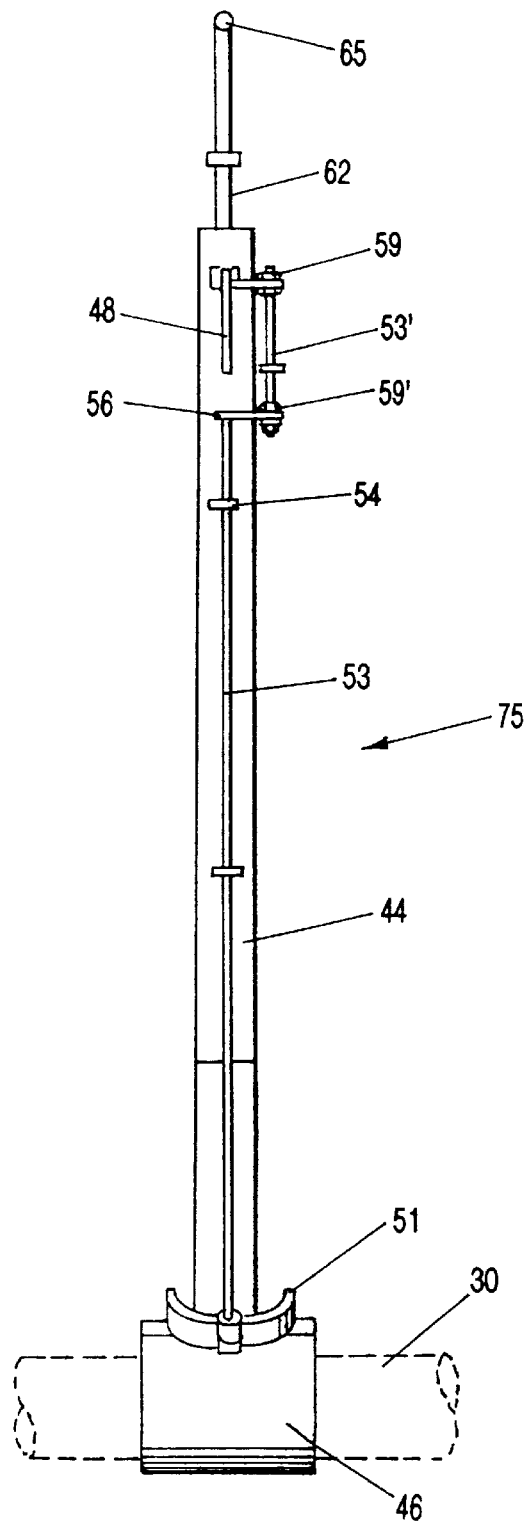
FIG. 10 is a side view of the tool depicted in FIG. 9.

FIGS. 9 and 10 show a general installation tool 75 according to the invention, which has a more universal use, that is, it is useable in practically any instance where it is desired to puncture a line 30 and concurrently insert a coupler 27 (FIG. 8) therein. This general installation tool 75 thus is useable to insert a single coupler 27 to connect one side of a valve bridge 25 to a single line 20 or 30, or to install a coupler into one line and then another coupler into another line to permit the lines to be fluidly interconnected, or to install a coupler into an auxiliary line 30 to which a lateral or feeder line may be connected.

The general installment tool 75 is similar in most respects to one-half of the bridge installation tool 40, i.e. the tool 75 essentially is one of the portions 41 or 41' of the bridge installation tool. Like elements are similarly labeled in FIGS. 5 and 6 and 9 and 10. Tool 75 functions identically, and offers the advantage of being useable in confined spaces or trenches where the bridge installation tool 40 is excessively wide or bulky. Also, the availability of the general installment tool 75 permits tremendous flexibility in system design and modification, since it permits a coupler 27 to be installed almost anywhere along any line 20 or 30. The coupler 27 may then be used to provide a fluid communication from the line 20 to almost any other line or irrigation apparatus.

Figure 16:
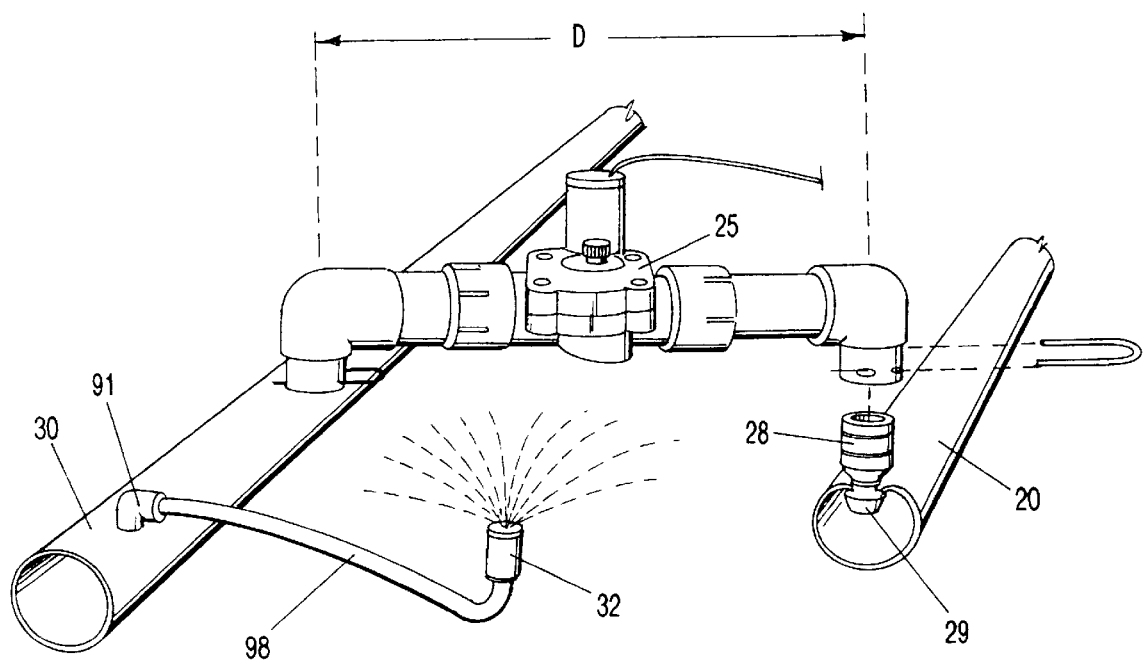
FIG. 16 is a perspective partially exploded view of a certain portion of the irrigation system according to the invention shown in FIG. 2.

An advantage of the bridge installation tool 40, however, is apparent. In the preferred embodiment of the invention, the valve bridge 25 has an overall length D (FIG. 16). All the valve bridges 25 incorporated into a system preferably have the same universal length D. The substantially uniform distance d (FIG. 2) separating the main line 20 and the auxiliary line 30 is less than or approximately equal to the length D of the valve bridge 25. The two portions 41, 41' (or, more accurately, the turn rods 62 in each of the portions 41, 41') are constantly and invariably separated by the braces 42, 42' to a spaced-apart distance equal to the length D of the bridge 25. Consequently, the bridge installation tool 40 invariably and repeatedly may be used to insert couplers 27 into the lines 20, 30 at precisely the right distance of separation equal to D, so that the valve bridge 25 always may be connected to each coupler 27 in corresponding pairs of couplers. The bridge 25 may be, needn't always be, installed perpendicular to the lines 20, 30.

As mentioned, the housings 44, 44' may be rotated within the braces 42, 42' so that the clamps 45, 45' need not always be perpendicular to the braces, or even mutually parallel. Thus, in the event the distance d separating the lines 20 and 30 is less than the length D of the bridge 25 (and the distance separating the turn rods 62), the clamps 45, 45' may be rotated to define equal oblique angles with respect to the braces 42, 42'; the tool 40 may then be placed with the clamps 45, 45' on respective lines 20, 30, and the braces 42, 42' disposed obliquely with respect to the lines 20, 30 thereby to span the lines. The tool 40 may then be used to install couplers at the proper distance of separation D, despite the lines 20, 30 being spaced apart a lesser distance. In such an installation, the couplers will be located at axially offset points along the lines. It is immediately evident that when the lines 20, 30 are spaced apart a distance d (FIG. 2) which equals the length D (FIG. 16) of the valve bridge 25, the clamps 45, 45' are used in a position perpendicular to the braces 42, 42', and the tool 40 is deployed with the braces 42, 42' orthogonal to the lines 20, 30. In this installation, the couplers are installed at correspondingly equal axial locations along respective lines 20, 30. The rotatable character of the clamps 45, 45' permits the tool 40 to be used even to connect a pair of lines in perpendicular relation, if desired.

Attention is invited to FIGS. 11–15. The preferred embodiment of the invention also includes a means for connecting a discharger 32, such as a sprinkler head, to a defined segment of the auxiliary line 30. Because a lateral feeder line 98 typically has a smaller diameter than the main and auxiliary lines 20, 30, the elbow coupler 91 used to connect the lateral feeder line need not be as large a diameter as other couplers, e.g. coupler 27. Consequently, the lateral puncture tool 80 need not be as heavy-duty as the tools 40, 75 used to connect the heavier gauge lines 20, 30. (One of ordinary skill in the art will appreciate that the elbow coupler 91, while here characterized as an integral one-piece fitting, may suitably consist of a comparatively flexible barbed coupler separately inserted into one leg of a PVC elbow fitting, for example.) Also, a simpler tool 80 for puncturing a line 30 and a separate, simple lateral insertion tool 100 promote ease and flexibility in the connection of a lateral line 98 to the auxiliary line 30.

The lateral puncture tool 80 supports the walls of the auxiliary line 30 while a hole is punctured at a point thereon. The lateral insertion tool 100 may then be used to expeditiously insert a lateral elbow coupler 91 into the hole punctured by the tool 80. Like each portion 41 of the bridge installation tool 40 and the general installation tool 75, the lateral puncture tool 80 has a tubular housing 84 within which a turn rod 82 is axially concentrically disposed. The turn rod 82 has a threaded portion (not shown in FIGS. 11 and 12) engaged with an internal threaded block or interior portion (also not shown, but essentially the same as the block 60 seen in FIGS. 7 and 8) of the housing 84. In a manner substantially the same as described for the bridge installation tool 40, rotation of the turn rod 82 results in the screw-like motion of the turn rod within the housing 84. As seen in FIGS. 11 and 12, the top end of the turn rod 82 extends from the upper end of the housing 84 of the tool 80. A rotatable handle 81 is secured to the top of the turn rod 82, wherewith rotary motion may be manually imparted to turn the turn rod. The bottom end of the turn rod 82 is sharpened to a point or is fitted with a sharp-tipped punch 86. The turn rod 82 has a length such that the punch 86 tip is extendable from the bottom end of the housing 84 as the operator turns the handle 81 to screw the rod 82 downward. The axial movement of the turn rod 82 is controlled, therefore, by the regulated rotation of the handle 81 which turns the rod within the block 60.

The lateral puncture tool 80 features a grip portion 88 (in lieu of a movable clamp) wherewith the line 30 can be secured and supported during actuation of the turn rod 82 and punch 86. The overall function of the lateral punch tool 80 therefore is seen to be similar to the function of either portion 41, 41' of the bridge installation tool 40 or the general installation tool 75, with the important exception that the punch 86 does not mount the elbow coupler 91 during the puncturing process.

The grip portion 88 has no moving parts, but comprises a pair of generally semicylindrical, arcuate, longitudinally offset grip flanges 89, 89' as illustrated in FIGS. 11–13. The flanges 89, 89' are substantially identical, but are oppositely positioned with respect to the housing 84. As seen in FIG. 11, a flange is disposed on either side of the housing 84, and FIGS. 12 and 13 show that one flange 89' depends down from the front of the housing while the other flange 89 depends from the back of the housing. Each of the gripper flanges 89 is generally arcuate in shape, and defines an arc of approximately 180°. The radii of the flanges are about equal, and generally correspond to the outside radius of the line 30 as seen in FIG. 12. Referring to FIG. 11, the left side flange 89 opens one direction (i.e. out of the plane of the paper in FIG. 11) while the right side flange 89' opens the opposite direction (i.e. into the plane of the paper in FIG. 11). However, as seen in FIG. 12, the arcs of the two flanges 89, 89' have a common axis, so that when viewed from either side they appear to define a cylinder capable of fully encircling the line 30. Referring again to FIG. 13, the open side 93 of the left side flange 89 is radially opposite, with respect to the axis of the arcs of the flanges, from the open side 93' of the rightside flange 89. The respective exterior ends 94, 94' of the flanges 89, 89' define parallel vertical imaginary planes as indicated by FIGS. 11 and 13. Importantly, the interior ends 87, 87' of flanges 89, 89' are cut to be contained in imaginary planes tilted at an angle from vertical, as seen in FIG. 11. The imaginary planes, as FIG. 11 suggests, diverge downwardly from the bottom end of the housing 84. Also, as seen in FIG. 13, the interior ends 87, 87' of the flanges are cut along a helix of the imaginary cylinder containing the flanges, so that an oblique resection defines a line-receiving space 90 axially intermediate to the two flanges 89, 89' and symmetrically below the housing 84 and punch 86.

The use of the grip portion 88 of the tool 80 is briefly described in view of the foregoing. To grab and hold the line 30 while the line is at the bottom of a hole, the tool 80 is lowered into the hole bottom end first. The tool 80 is manipulated so that the line-receiving space 90 is aligned with the line 30. The tool 80 is lowered down by means of the fixed handle 85 with the flanges 89, 89' on opposite sides of the line 30, the interior ends 87, 87' just clearing the walls of the line. Using handle 85 the tool 80 is then rotated about its axis (clockwise as viewed in FIG. 13) to draw the open sides 93, 93' of the flanges 89, 89' toward the line. Rotation of the tool 80 is continued until the inside walls of the flanges 89, 89' both obtain flush contact with the outside of the line 30, and the bottoms of both flanges 89, 89' are disposed beneath the line 30 as shown in FIG. 12. With the flanges 89, 89' pressing against the line 30 at longitudinally offset locations and at radially opposite sides of the line, the tool 80 thereby provides circumferential support for the walls of the line 30 while the punch 86 punctures the line by means of the screwed actuation of the turn rod 82. With the line 30 so supported, the operator manually turns the handle 81 to screw the turn rod downward, causing the punch 86 to descend forcibly to puncture the top of the line 30 as suggested by the dashed directional arrow of FIG. 11. Once the hole thereby has been punctured in to the top of the line 30, reversed rotation of the handle 81 causes the turn rod 82 to ascend into the housing 84, and the punch 86 is extracted from the line and withdrawn into the housing.

Figure 14:
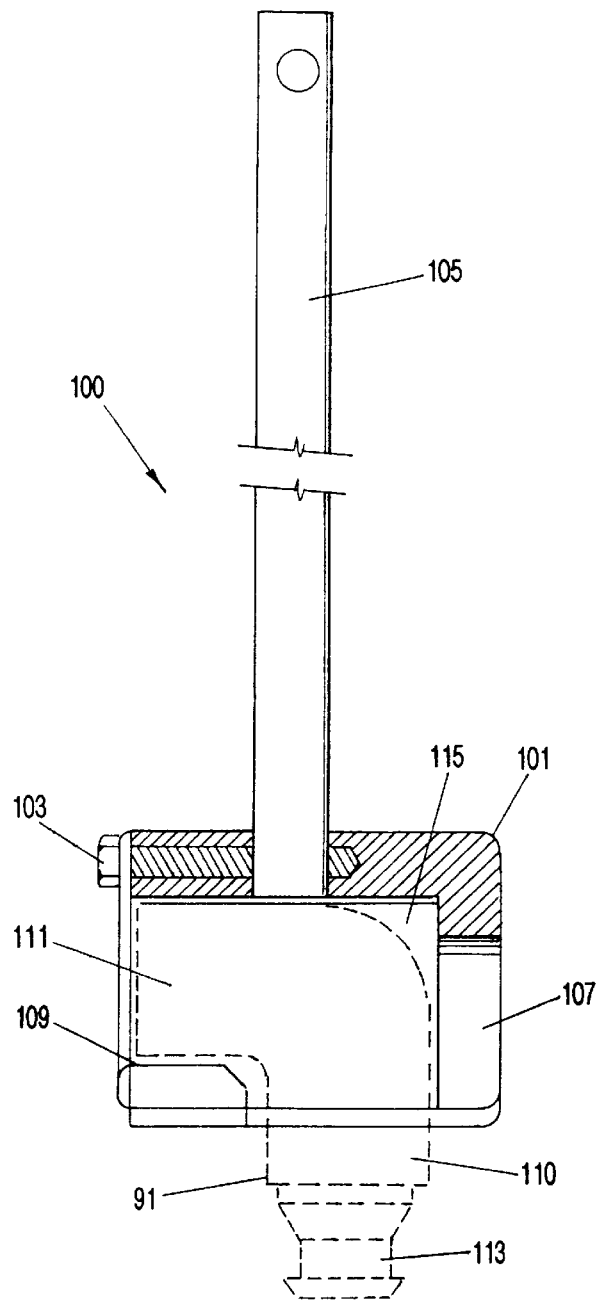
FIG. 14 is a front view, in partial section, of a lateral coupler insertion tool according to the present invention.
Figure 15:
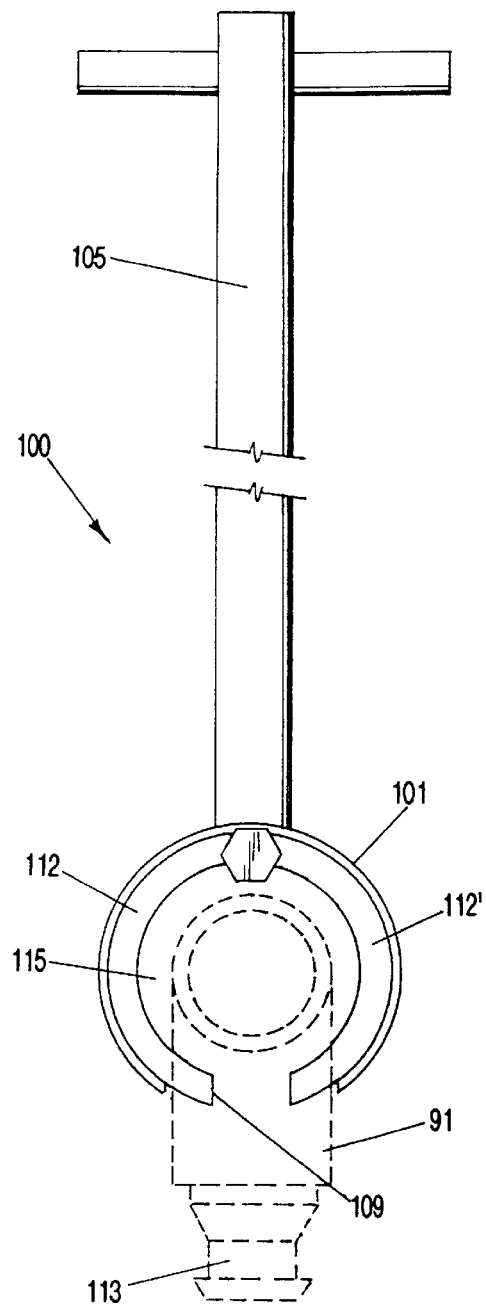
FIG. 15 is a side view of the coupler insertion tool shown in FIG. 14.

To avoid the need, during installation, for an individual to descend into or to reach down into an excavation to insert an elbow coupler 91 into the hole in the line 30 created with the lateral puncture tool 80, there is provided according to the invention a lateral insertion tool 100, one embodiment of which is shown in FIGS. 14 and 15, which serves as a means for releasably gripping a coupler 91 and inserting the coupler into a hole created by the puncturing tool 80. The lateral insertion tool 100 is a modified cylindrical body 101 immovably (but optionally temporarily, as by a screw 103 or the like) secured to the end of a lengthy elongated handle 105. The body 101 releasably holds an elbow coupler 91 to permit the coupler to be lowered down to the line 30 and forced into the puncture hole resulting from the use of the lateral puncture tool 80.

The advantages of the tool 100 are realized from the configuration of the gripper body 101. Gripper body 101 fashioned from a thick-walled metal tube or the like. Two contiguous sections of the lower portion of the wall of the body 101 are cut away to define a slot extending from one end of the tube to the other. The arcuate widths of the two cut-away sections differ, such that the slot is wider at one end (i.e. to the right in FIG. 14) than at the other end (the left of FIG. 4). The wider portion 107 of the slot is wider laterally than the diameter of the lower leg 110 of the coupler 91, while the narrower portion 109 of the slot is narrower than the diameter of the upper leg 111 of the coupler. As a result, the coupler 91 may be manually inserted via the wider slot 107 into the central hollow 115 of the body 101 (i.e. from right to left in FIG. 14), as the wider slot permits sliding passage of the lower leg 110. However, the upper leg 111 cannot pass between the body walls 112, 112' defining the narrow slot 109, as seen in FIG. 15. Consequently, the elbow coupler 91 when inserted into the body 101 is retained therein unless withdrawn by being pulled back out through the wider slot 107.

In the practice of the invention, the elbow coupler 91 is manually inserted into the gripper body 101 portion of the tool 100 to obtain the position shown in phantom in FIGS. 14 and 15. The gripper body 101 bearing the elbow coupler 91 is then lowered down to the line 30 (FIG. 12) at the point where the line 30 has been punctured by the lateral puncture tool 80. The barbed insertion portion 113 of the elbow coupler 91 is aligned with the hole punched in the line 30, and the user then pushes firmly and quickly straight downward upon the handle 105, the pushing force is transmitted via the body 101 to the upper leg 111, and the barbed portion 113 is inserted into the hole. The resilient wall of the line 30 flexes against the barbed portion 113 of the coupler 91, thereby sealing against significant leakage the junction of coupler 91 to line 30. The elbow coupler 91 thereby is secured to the line 30. The user then uses the handle 105 to move the body 101 (e.g. from right to left in FIG. 14) to pass the coupler 91 through the wider slot 107 to disengage the tool 100 from the coupler and lift the tool from the excavation.

A comprehensive description of the practice of an embodiment of the invention follows. Referring to FIG. 2, a main line 20 and parallel auxiliary line 30 are installed in the subsurface along the desired route, preferably at a substantially uniform separation distance d, for example, about six inches. One or both ends of the main line 20 are placed in fluid connection (via any appropriate intermediate check valves, conduit, fittings, etc.) with the water source 21. The ends of the auxiliary line 30 are not connected to anything, but preferably are capped against leakage. FIG. 2, for example, shows that any one of a number of selected areas, such as selected area A, is identified to which it is desired to deliver water. A suitable length of the auxiliary line 30 adjacent or beneath selected area A is identified, and the suitable length of auxiliary line 20 is severed to define a segment. The ends of the segment are fitted with suitable caps 38, 38' or other seals to prevent leakage from the ends of the segment.

Continuing reference is made to FIG. 2. The user determines the preferred location for a bridge valve 25 by which water will move under pressure from the main line 20 to the segment of auxiliary line 30. The lines 20 and 30 are excavated and exposed at that location. The bridge installation tool 40 is brought to the bridge installation location. The bridge installation tool 40 is at once the means for puncturing a hole in the wall of the auxiliary line 20 at a point on the line segment and inserting a coupler 27 into the hole, as well as the means for puncturing a hole in the wall of the main line 30 at a point on the main line and inserting a coupler 27 into that hole.

With reference to FIGS. 4–6, the grip 48 on each handle 47 on both portions 41, 41' of the tool 40 is pivoted downward around the pin 49, which movement is translated via the transfer rods 53, 53' into a pivoting of the movable jaw 46' into the open position as seen on the right side of FIGS. 4 and 5. The rotatable handle 65 on each portion 41, 41' is turned to screw the turn rod 62 within the threaded block 60 to withdraw the punch 66 inside the lower end of the housing 44. A coupler 27 is frictionally slipped over each punch 66 until seated against the stop ring 69, as seen in FIG. 7. The fit of the coupler 27 over the punch 66 is adequate such that the coupler is retained by friction upon the punch even when the punch is in the vertical position seen in FIG. 7.

With both clamps 45, 45' in the open position, and a coupler 27 upon each punch 66, the tool is lowered into the excavation and the jaws 46, 46' of both pairs of clamps 45, 45' are placed on opposite sides of corresponding lines 20, 30, as seen in FIG. 5. Each housing and associated clamp 45 or 45' is pivoted as needed with respect to the braces 42 to align each clamp to a corresponding line 20, or 30. The grip 48 on each of the portions 41, 41' of the tool 40 is forcibly pivoted upward, resulting in the pivotal lowering of each movable jaw 46' to close the clamps 45, 45'. The clamps securely grip and circumferentially support the lines 20, 30 against significant radial deformation. In the preferred embodiment, the clamps 45, 45' are deliberately adjusted such that when closed, they squeeze the lines 20, 30 slightly to vertically deform the lines to have elliptical radial cross sections, the major axis of the ellipses being vertical. By slightly pre-deforming the lines 20, 30 into vertically aligned ellipses, additional working room within the lines is provided whereby the bridge couplers 27 can be inserted through the top wall of each line without the punch 66 inadvertently also puncturing the bottom wall of the line (FIG. 8).

With both clamps 45, 45' engaged around respective lines 20, 30, thereby to circumferentially support the wall of the lengths of the lines contacted by the clamps, the bridge installation tool 40 is actuated to simultaneously to puncture the upper wall of a line and insert a bridge coupler 27 into the resulting puncture hole. Each portion 41, 41' of the tool 40 is used to puncture a hole at a point in the corresponding line 20 or 30 disposed within an associated clamp 45 or 45'.

The rotatable handle 65 on each portion 41, 41' of the tool 40 is used manually to rotate the associated turn rod 62 connected thereto. FIGS. 7 and 8 disclose that as each turn rod 62 is rotated, its threaded screw portion 63 turns through the threaded block 60, causing the punch 66 to descend within the housing 44 and emerge from the bottom thereof. Continued rotation of the handle 65 results in the tip of the punch 66 contacting the outer surface of the line 20 or 30, as illustrated in FIG. 7. The operator continues to rotate the handle 65, which rotation, by the action of the threaded engagement between rod 62 and immobile block 60, forces the punch 60 through the wall of the line 20 (or 30). As best seen in FIG. 8, as the punch 60 punctures through the line 20 (or 30), it carries with it the coupler mounted thereon. The coupler 27, as pushed by the stop ring 69, follows the punch 66 into the hole created by the punch in the wall of the line 20. Once the barbed ridge on the head 29 of the coupler 27 has penetrated the wall of line 20, the rotation of the turn rod 62 is terminated, so that the tip of the punch 66 preferably never contacts the inside of the opposite wall of the line. The user then counter-rotates the rotatable handle 65, thereby to raise the rod 62 in the housing 44 and withdraw the punch 66 from within the line 20. However, as seen in FIG. 8, the barb ridge on the head 29 of the coupler 27 catches the inside of the wall of the line 20, so that the coupler 27 is caught to the line and is left in its inserted place as the punch 66 is extracted. When the bridge installation tool 40 is removed entirely, a coupler 27 remains in place at the selected point on the line 20, with the butt portion 28 of the coupler protruding from each of the lines 20, 30. One coupler 27 is seen on the right side of FIG. 16 as protruding from the main line 20. Thus, the tool 40 permits the lines 20, 30 to be punctured, and respective coupler inserted therein, either simultaneously (by two operators) or consecutively.

Combined reference to the right side of FIG. 16, and particularly to FIG. 8, indicates how in the practice of the invention the wall of either line 20 or 30 is permitted to reflexively rebound against the head 29 of the coupler 27, substantially to seal the hole in the wall against leakage. Particularly when the line 20 or 30 is pressurized, the wall is pressed against the coupler 27, and insignificant or no water leakage occurs where the coupler 27 passes though the wall of the line 20.

As illustrated by FIG. 16, a valve bridge 25 is then situated between the corresponding pair of installed couplers 27. The valve bridge 25 is of simple construction, and includes, for example, an electrically controlled, solenoid activated valve assembly (e.g. one-inch diameter throat) placed intermediately in-line between short lengths of PVC pipe. Each piece of PVC pipe is connected distally to the horizontal leg of a PVC elbow fitting. As illustrated by FIG. 16, the vertical leg of each elbow fitting is then pressed around the exposed butt 28 of each coupler 27 mounted on the tops of the respective lines 20, 30. A friction fit of the ridged butt 28 into the elbow fitting, and/or O-rings or other seals, provides a leak-proof seal. For added security, the prongs of a U-shaped wire clip may be inserted through opposing pairs of holes provided at the ends of short parallel chords of the circular vertical leg of each elbow fitting. The prongs of the U-shaped wire engage the ridges on the butt 28 of the coupler 27 to prevent the elbow fitting from popping off the coupler 27 when the system is pressurized. The valve bridge 25, as secured to the pair of couplers 27 in the lines 20, 30 as seen in FIG. 16, accordingly serves as a preferred means for fluidly connecting the auxiliary line segment to the main line.

With the valve bridge 25 thereby installed to provide fluid communication from the main line 20 to the segment of the auxiliary line, the user may proceed to place the dischargers 32, 32' in the selected area A according to plan. The points on the segment of the auxiliary line 30 where the lateral feeders 98, 98' are to be connected are identified, and those points are exposed. The lateral puncture tool 80 is lowered into contact with the segment of the auxiliary line 30 at a lateral connection point, with the line situated between the flanges 89, 89'. The handle 85 is used to pivot the puncture tool 80, thereby bringing the flanges 89, 89' in to coaxial aligned contact with the line 30. With the tool 80 so positioned, the flanges 89, 89' provide circumferential support to the walls of the line. The rotatable handle 81 is manually rotated to screw the turn rod 82 downward forcibly to drive the punch tip 86 through the upper wall of the line 30 at the lateral feeder installation point. The handle 81 is then counter-rotated to accomplish a screwed withdrawal of the punch tip 86 from the segment of the line. The tool 80 is twisted to align the line 30 with the interior ends 87, 87', allowing the grip portion 88 to be disengaged from the line segment and the tool to be lifted from the excavation.

The user then quickly uses the lateral insertion tool 100 to insert the elbow coupler 91 into the hole created in the line 30 by the puncture tool 80. The elbow coupler 91 is inserted into the interior holding space of the gripper body 101 and is held in the position shown in FIGS. 14 and 15 by the body walls 112, 112'. Using the handle 105, the user lowers the gripper body 101, mounting the coupler 91, down to the line 30 at the point of the punctured coupler installation hole. The barbed end 113 of the coupler is aligned with the hole, and the by applying a downward force on the handle 105, the lower leg 110 is inserted into the hole in the segment of the auxiliary line 30. The handle 105 is then controllably moved to shift he gripper body 101 (e.g. from right to left in FIG. 14) to disengage the gripper body from the elbow coupler 91. The elbow coupler 91 remains connected to the top wall of the line 30 by the engagement of the barbed lower leg 110 with the upper wall of the line.

Substantially similarly to the conditions depicted FIG. 8, the wall of the line 30 reflexively rebounds against the lower leg 110 of the elbow coupler 91 substantially to seal the hole in the wall against leakage. Particularly when the line 30 is pressurized, the wall is pressed against the coupler 91, and insignificant or no water leakage occurs where the coupler 91 passes though the wall of the line 30.

Alternatively, or as indicated by the circumstances, the general installation tool 75 may be employed to puncture a line 20 or 30, instead of the bridge installation tool 40 or the lateral installation tool 80. The tool 75 thus can be used in lieu of the bridge installation tool 40 or the lateral installation tool 80 (but typically not both, in the same system).

As seen on the left-hand side of FIG. 16, therefore, the elbow coupler 91 thereby is securely installed to extend from the top of the identified segment of the line 30. As seen in that figure, the lateral feeder 98 of desired length is laid along the planned route in the subsurface, and sealably connected by known means to the upper leg 111 of the coupler 91. The desired discharger 32, such as a pop-up sprinkler, is then connected to the distal end of the lateral feeder 98, as seen in FIG. 16, for example by a conventional compression fitting.

Having described the installation of one bridge valve 25 on one identified segment of the auxiliary line 30, and the installation of one lateral feeder 98 in fluid connection between a discharger 32 and the segment of the auxiliary line, one of ordinary skill in the art will understand that the process may be repeated various times to install a full system, such as to irrigate the areas B and C as seen in FIG. 3. Moreover, it is now apparent to one skilled in the art, referring to FIG. 3, how the initially unused segment U of the auxiliary line 30 may be tapped at a later date to adapt the system to irrigate a fourth area between areas A and B. The ends of segment U merely need be sealed against leakage, a bridge valve installed between the segment U and the main line 20, to fluidly connect the two, and lateral feeders and dischargers connected to the segment U.

The lines 20, 30, 98 preferably but not necessarily are comprised of polyethylene to ease installation and provide the resilient seals between the couplers 27 and 91 and the lines themselves. These seals are enhanced by pressure in the system. Notably, concerns about "creep" in the polyethylene lines can be alleviated by the expedient of not constantly maintaining pressure in the system. The main valve 95 or other conventional means may be used to reduce or eliminate the pressure in the lines while the system is not in use. An advantage of the invention is that the connections between the valve bridges and the main and auxiliary lines, and also between the lateral feeder lines and the auxiliary line, are made by inserting couplers into the top of the main and auxiliary lines. The result is that deleterious water-borne detritus tends to remain in the larger-diameter main and auxiliary lines, rather than being routinely passed through the valves in the bridges and, even worse, into sprinkler and valve filters. The valve bridges 25, 25', 25" may be controllably activated, as by timers, to selectively irrigate distinct areas or zones of the landscape at different times or for different durations, or at the same time, according to conventions and devices known in the art. Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An irrigation system for delivering water from a source to a selected area within a landscape, said system comprising:
    a main line disposed beneath the landscape and having two ends, both ends connected to the source;
    an auxiliary line proximate to said main line;
    means for defining at least one close-ended segment in said auxiliary line;
    at least one discharger in the selected area in fluid communication with said segment; and
    means for fluidly connecting said segment to said main line.

2. A system according to claim 1 wherein said segment is severed from said auxiliary line and said means for defining comprises caps fixed to ends of said segment.

3. A system according to claim 1 wherein said means for fluidly connecting said segment to said main line comprises a tubular bridge disposed between said main line and said segment.

4. A system according to claim 3 wherein said bridge comprises a valve.

5. A system according to claim 3 wherein said main line and said auxiliary line each comprises a resiliently elastic wall, and said means for fluidly connecting further comprises:
    means for puncturing a hole in said wall of said auxiliary line at a point on said segment and inserting a first coupler into said hole; and
    means for puncturing a hole in said wall of said main line at a point on said main line and inserting a second coupler into said hole;
wherein said bridge is connected to said couplers, and said walls of said segment and of said main line reflexively rebound against respective said couplers substantially to seal said holes against leakage.

6. A system according to claim 5 wherein each said means for puncturing comprises:
    a rigid tubular housing having an upper end and a lower end;
    clamp means on said lower end for circumferentially supporting a respective one of said lines at one of said points;
    a punch movable axially within said housing and extendable at least partially from said lower end; and
    means on said housing for controlling movement of said punch;
wherein said coupler is removably disposable around said punch.

7. A system according to claim 6 wherein said means for controlling comprises:
    a threaded block in said housing;
    a threaded rod connected to said punch and engaged with said threaded block; and
    a rotatable handle emergent from said upper end and connected to said rod;
wherein rotation of said handle rotates said rod in said block thereby to cause said punch to move axially within said housing.

8. A system according to claim 6 wherein said clamp means comprises a fixed jaw and a pivotal jaw.

9. A system according to claim 1 further comprising means for connecting said at least one discharger to said segment.

10. A system according to claim 9 wherein said means for connecting comprises a lateral feeder line in fluid communication with said discharger and with said segment.

11. A system according to claim 10 wherein said auxiliary line comprises polyethylene.

12. A system according to claim 11 wherein said segment comprises a resiliently elastic wall, and said means for connecting further comprises:
   means for puncturing a hole in said wall at a point on said segment; and
   means for releasably gripping a coupler to insert the coupler into said hole;
wherein said lateral feeder line is connected to said coupler and said wall reflexively rebounds against said coupler substantially to seal said hole against leakage.

13. A system according to claim 12 wherein said means for puncturing comprises:
   a rigid tubular housing having an upper end and a lower end;
   grip means on said lower end for circumferentially supporting said segment at said point;
   a punch movable axially within said housing and extendable at least partially from said lower end; and
   means on said housing for controlling movement of said punch.

14. A system according to claim 13 wherein said means for controlling comprises:
   a threaded block in said housing;
   a threaded rod mounting said punch and engaged with said threaded block; and
   a rotatable handle emergent from said upper end and connected to said rod;
wherein rotation of said handle rotates said rod in said block thereby to cause said punch to move axially within said housing.

15. A system according to claim 13 wherein said grip means comprises a pair of fixed, longitudinally offset arcuate flanges defining therebetween a space for receiving said segment.

16. A system according to claim 12 wherein said means for releasably gripping comprises:
   an elongated handle; and
   a slotted cylindrical body, defining a central hollow therein, secured to an end of said elongated handle;
wherein said coupler is slidably disposable into said central hollow.

17. An irrigation system comprising:
   a main line fluidly connected to a water source;
   said main line comprising two ends, each connected to the source;
   an auxiliary line spaced apart a distance from, and parallel to, said main line along at least a portion of the length of said main line;
   at least one segment defined in said auxiliary line;
   at least one bridge fluidly connecting said at least one segment to said main line;
   at least one lateral feeder line connected to said at least one segment; and
   at least one discharger connected to said at least one lateral feeder line;
wherein irrigation water is delivered from said main line to said segment exclusively via said bridge.

18. A system according to claim 17 wherein said at least one segment is severed from said auxiliary line, and further comprising caps fixed to ends of said segment.

19. A system according to claim 17 further comprising valve means in said at least one bridge for selectively controlling the flow of water through said bridge.

20. A system according to claim 17, further comprising means for installing said bridge in connection with said segment and said main line, said means for installing comprising:
   means for puncturing a hole in said auxiliary line at a point on said segment and inserting a first coupler into said hole; and
   means for puncturing a hole in said main line at a point on said main line and inserting a second coupler into said hole;
wherein said two means for puncturing and inserting are spaced apart said distance, and secured together in parallel relation, by at least one brace.

21. A method for delivering water from a source to a selected area within landscape comprising:
   (a) disposing beneath the landscape a main line having two ends, and connecting both ends to the source;
   (b) placing an auxiliary line proximate to the main line;
   (c) defining at least one close-ended segment in the auxiliary line;
   (d) installing at least one discharger in the selected area in fluid communication with the segment; and
   (e) fluidly connecting said segment to the main line.

22. A method according to claim 21 wherein defining at least one segment comprises:
   (a) severing a segment from the auxiliary line; and
   (b) fixing caps to ends of the segment.

23. A method according to claim 21 wherein fluidly connecting the segment to the main line comprises disposing a tubular bridge between the main line and the segment.

24. A method according to claim 23 wherein disposing a bridge further comprises providing a valve in the bridge.

25. A method according to claim 24 wherein puncturing comprises:
   (a) providing at least one rigid tubular housing having an upper end and a lower end;
   (b) circumferentially supporting both the lines at respective ones of the points;
   (c) removably disposing the coupler around a punch; and
   (d) controllably moving the punch axially within the housing to extend the punch at least partially from the lower end.

26. A method according to claim 25 wherein controllably moving the punch comprises:
   (a) connecting the punch to a threaded rod in the housing;
   (b) engaging the threaded rod with a threaded block within the housing; and
   (c) rotating a handle emergent from the upper end and connected to the rod thereby to cause the punch to move axially within the housing.

27. A method according to claim 26 wherein circumferentially supporting comprises clamping a line between a fixed jaw and a pivotal jaw.

28. A method according to claim 23 further comprising disposing main line and placing an auxiliary line each having a resiliently elastic wall, and connecting the segment to the main line further comprises:
   (a) puncturing a hole in the wall of the auxiliary line at a point on the segment and inserting a first coupler into the hole;
   (b) puncturing a hole in the wall of the main line at a point on the main line and inserting a second coupler into the hole;
   (c) connecting the bridge to the couplers; and (d) permitting the walls of the segment and of the main line reflexively to rebound against respective couplers substantially to seal the holes against leakage.

29. A method according to claim 21 further comprising connecting the at least one discharger to the segment.

30. A method according to claim 29 wherein connecting the at least one discharger comprises placing a lateral feeder line in fluid communication with the discharger and with the segment.

31. A method according to claim 30 wherein placing the auxiliary line comprises placing a polyethylene line.

32. A method according to claim 31 wherein the segment comprises a resiliently elastic wall, and connecting the at least one discharger further comprises:
   (a) puncturing a hole in the wall at a point on the segment;
   (b) releasably gripping a coupler to insert the coupler into the hole;
   (c) connecting the lateral feeder line to the coupler; and
   (d) permitting the wall reflexively to rebound against the coupler substantially to seal the hole against leakage.

33. A method according to claim 32 wherein releasably gripping comprises:
   (a) providing an elongated handle;
   (b) securing to an end of the handle a slotted cylindrical body defining a central hollow therein; and
   (c) slidably disposing the coupler into the central hollow.

34. A method according to claim 32 wherein puncturing comprises:
   (a) providing a rigid tubular housing having an upper end and a lower end;
   (b) circumferentially supporting the segment at the point; and
   (c) controllably moving a punch axially within the housing to extend the punch at least partially from the lower end.

35. A method according to claim 34 wherein circumferentially supporting comprises rotating said housing to press against the segment a pair of fixed, longitudinally offset arcuate flanges.

36. A method according to claim 34 wherein controllably moving a punch comprises:
   (a) mounting the punch to a threaded rod in the housing;
   (b) engaging the threaded rod with a threaded block within the housing; and
   (c) rotating a handle emergent from the upper end and connected to the rod thereby to cause the punch to move axially within the housing.

* * * * *